US005603305A

United States Patent [19]

Miyake et al.

[11] Patent Number: 5,603,305
[45] Date of Patent: Feb. 18, 1997

[54] EXHAUST GAS RECIRCULATION VALVE

[75] Inventors: Toshihiko Miyake; Katsuyuki Nitta; Hiroki Yamasaki; Mutsuo Sekiya, all of Tokyo, Japan

[73] Assignee: Mitsubishi Denki Kabushiki Kaisha, Tokyo, Japan

[21] Appl. No.: 572,671

[22] Filed: Dec. 14, 1995

[30] Foreign Application Priority Data

May 22, 1995 [JP] Japan .................................... 7-122278
Jul. 10, 1995 [JP] Japan .................................... 7-173508

[51] Int. Cl.[6] ............................ F02M 25/07; F16K 11/18
[52] U.S. Cl. ........................... 123/568; 123/571; 137/870
[58] Field of Search .................................... 123/568, 569, 123/570, 571, 90.12, 90.14; 137/625.25, 625.42, 870

[56] References Cited

U.S. PATENT DOCUMENTS 2,667,155 1/1954 Paluch et al. ........................ 123/90.14
4,364,369 12/1982 Nomura et al. ......................... 123/569
4,398,524 8/1983 Rachedi .................................. 123/568
4,454,855 6/1984 Otobe et al. ........................... 123/571
4,459,964 7/1984 Straubel et al. ........................ 123/568
4,467,673 8/1984 Hamada et al. ........................ 123/571
4,495,968 1/1985 Kist ......................................... 137/870
4,531,706 7/1985 Weiger et al. .......................... 123/571
4,570,676 2/1986 Nishio et al. ........................... 137/870
4,782,810 11/1988 Shimoda et al. ....................... 123/571
4,878,464 11/1989 Richeson, Jr. et al. .............. 123/90.14
5,067,470 11/1991 Panten et al. ........................... 123/568
5,193,495 3/1993 Wood, III et al. ................... 123/90.14

FOREIGN PATENT DOCUMENTS 59-43205 3/1984 Japan .
61-109905 5/1986 Japan .

*Primary Examiner*—Willis R. Wolfe
*Attorney, Agent, or Firm*—Sughrue, Mion, Zinn, Macpeak & Seas

[57] ABSTRACT

An exhaust gas recirculation valve comprises a housing which constructs a part of an exhaust gas path for receiving exhaust gas from an exhaust pipe of an internal combustion engine, the housing accommodating a valve mechanism for controlling the amount of flow of the exhaust gas passing therethrough, a fixed cylinder disposed in the housing, a movable cylinder assembly composed of at least one movable cylinder disposed in the fixed cylinder, a piston movably disposed in the movable cylinder assembly for controlling an opening of the valve mechanism, and a pressure applying mechanism for respectively applying pressure to the movable cylinder and the piston so as to move them through respective predetermined strokes. The exhaust gas recirculation valve can control its opening to one of a plurality of opening levels by moving the movable cylinder and piston through the respective predetermined strokes by means of the application of the pressure of air by the pressure applying mechanism, so as to provide a needed opening with reliability. Furthermore, by shortening the predetermined strokes of the movable components, there is provided the exhaust gas recirculation valve insensitive to a change in the pressure of air supplied by the pressure applying mechanism.

22 Claims, 16 Drawing Sheets

EXHAUST GAS RECIRCULATION VALVE

BACKGROUND OF THE INVENTION

1. Field of the Invention

The present invention relates to an exhaust gas recirculation valve for use in an exhaust gas recirculation system such as an internal combustion engine for vehicles or the like.

2. Description of the Prior Art

In general, in order to reduce the amount of nitrogen oxides (NOx) included in exhaust gas from an internal combustion engine disposed in an automobile or the like, an exhaust gas recirculation control system has been used for feeding a part of the exhaust gas back into the inlet of the internal combustion engine so as to burn the part of the exhaust gas again.

Referring now to FIG. 16, it illustrates an exhaust gas recirculation system incorporating a prior art exhaust gas recirculation valve abbreviated as an EGR valve. In the figure, reference numeral 1 denotes an internal combustion engine, 2 denotes a combustion chamber disposed in the internal combustion engine 1, 3 denotes an exhaust pipe connected with the combustion chamber 2 for making exhaust gas passing therethrough, 4 denotes an exhaust gas recirculation cooler or an EGR cooler connected with the exhaust pipe 3 for taking in a part of the exhaust gas from the combustion chamber 2 so as to cool it, 5 denotes an exhaust gas recirculation valve (or EGR valve) connected with the EGR cooler 4 for receiving the exhaust gas cooled by the EGR cooler 4 and for adjusting the amount of the exhaust gas to be recirculated into the inlet pipe (not shown in the figure) of the internal combustion engine 1, 10 denotes a solenoid valve, to which a duty signal, in which the transition between its on state and its off state takes place tens times per second, having a duty cycle according to the load on the engine is applied, for supplying compressed air at a pressure according to the duty cycle to the exhaust gas recirculation valve 5, and 11 denotes a pressure reducing valve for reducing the pressure of the compressed air from a compressor mounted in an automobile or the like to a predetermined pressure and for supplying the air at the predetermined pressure to the solenoid valve 10.

The EGR valve 5 is provided with a control valve 6 and a pressure chamber 9 separated from another space in the EGR valve by a sealing member 7 and a piston ring 8. Air at a positive pressure is applied to the pressure chamber 9 from a compressor (not shown in the figure) mounted in the automobile by way of the pressure reducing valve 11 and solenoid valve 10 which controls the pressure of the compressed air passing through the pressure reducing valve 11 in response to the duty signal. The exhaust gas recirculation valve 5 is so constructed as to change the opening of the control valve 6 thereof according to the pressure of the air fed by the solenoid valve 10 in order to control the amount of the exhaust gas to be recirculated. The exhaust gas recirculated under the control of the EGR valve 5 is fed into the inlet pipe (not shown in the figure) of the internal combustion engine 1 and is then mixed with air sucked into the engine, with the result that the temperature in the combustion chamber 2 of the internal combustion engine 1 decreases and hence the amount of nitrogen oxides included in exhaust gas is reduced.

The exhaust gas is kept at a high temperature just after it is discharged out of the exhaust pipe 3, though its temperature decreases by the time it reaches the exhaust gas recirculation valve 5 because it is cooled by the EGR cooler 4. As a result, the amount of heat transferred from the exhaust gas to the EGR valve 5 is reduced and hence the degree of aging of the sealing member 7 and piston ring 8 due to the heat is reduced.

Referring now to FIG. 17, it illustrates a cross-sectional view showing the structure of the aforementioned prior art EGR valve 5. In the figure, reference numeral 12 denotes a housing having an exhaust gas path 15 disposed therein and an air inlet 12*a*, 13 denotes an exhaust gas inlet of the path 15 for receiving the exhaust gas discharged out of the exhaust pipe 3 of the internal combustion engine 1, 14 denotes an exhaust gas outlet of the path 15 for feeding the exhaust gas into the inlet pipe (not shown in the figure) of the internal combustion engine 1, and 16 denotes a dough-nut-shaped valve seat disposed in the exhaust gas path 13 inside the housing 12. The control valve 6 can come into contact with the valve seat 16. Furthermore, reference numeral 17 denotes a sliding member mounted in the housing 12 and slidably engaged with the control valve 16 which can slide up and down, 17*a* denotes a cylindrical holder disposed under the sliding member 17 mounted in the housing 12, and located in the upper portion of the exhaust gas path 15 for preventing carbon or the like included in the exhaust gas from entering the EGR valve 5, 17*b* denotes a metallic fiber filter built in the holder 17*a* for cutting down carbon or the like adhered to the sliding member of the control valve 6 to prevent the carbon or the like included in the exhaust gas from entering the EGR valve 5.

Reference numeral 18 denotes a disc-shaped pressure plate, the center portion of which is secured to the upper end of the control valve 6 with a nut 18*a*, 19 denotes a compressed spring for pushing the pressure plate 18 in an Upward direction, 20 denotes a cylinder secured to the housing 12 with bolts 20*a*, and 22 denotes a piston which can slide within the cylinder 20. The sealing member 7 for sealing and forming the pressure chamber 9 and the piston ring 8 for ensuring that the piston 22 slides stably within the cylinder 20 are located in the space between the cylinder 20 and the piston 22. A pressure applying port 21 for feeding control air at a predetermined pressure into the pressure chamber 9 is attached to the cylinder 20.

In the prior art exhaust gas recirculation valve 5 having the structure mentioned above, the piston 22 is pushed downward in such a manner that its travel depends on the pressure of the control air fed into the pressure chamber 9 through the pressure applying port 21, and the control valve 6 is opened in such a manner that its opening depends on the travel of the piston, with the result that the exhaust gas discharged out of the exhaust pipe 3 of the internal combustion engine 1 enters the exhaust gas path 15 by way of the inlet 13 of the path and reaches the inlet of the engine by way of the outlet 14 of the path. Then, the exhaust gas is mixed with a mixture of fuel and air and is then fed into the combustion chamber 2 of the internal combustion engine 1 for the afterburning of the exhaust gas. Thus, the amount of nitrogen oxides (NOx) which is a toxic constituent included in the exhaust gas is reduced.

Air from a compressor for use in an automobile is kept at high pressure; its pressure is typically between 5 $kg/cm^2$ and 9 $kg/cm^2$. Therefore, when the compressed air from the compressor is directly applied to the solenoid valve 10 in which the switching between on and off is repeated tens times per second, it is difficult to control the opening of the control valve 6 of the exhaust gas recirculation valve 5 to within a range of fine opening levels or middle opening levels. Therefore, after the pressure of the compressed air is reduced to a predetermined pressure by the pressure reducing valve 11, it is supplied to the solenoid valve 10.

In the prior art exhaust gas recirculation valve having the aforementioned structure, the middle opening controlling operation is performed with control of the duty cycle of a signal applied to the solenoid valve 10, though the pressure of the air supplied to the pressure chamber 9 by way of the solenoid valve 10 varies because the pressure of the air passing through the pressure reducing valve 11 varies with a change in the pressure of the compressed air from the compressor as an air source. Therefore, the prior art exhaust gas recirculation valve suffers from a disadvantage that the exhaust gas recirculation cannot be performed effectively because of changes in the opening of the control valve 6 within a range of fine opening levels, e.g., in the 40% to 20% opening level range, or within a range of middle opening levels, which must be controlled with high accuracy from the viewpoint of the reduction of NOx in the internal combustion engine and the increase of gas mileage.

Another disadvantage is that it is difficult to stably maintain the opening of the control valve 6 at a fine opening level because the pressure of the air supplied to the pressure chamber 9 by the solenoid valve 10 must be limited when controlling the opening of the control valve to within a range of middle opening levels, and endurance of the exhaust gas recirculation valve 5 is reduced remarkably because a collision between the control valve 6, the opening of which is maintained at a small opening level, and the valve seat 16 is repeated.

SUMMARY OF THE INVENTION

It is therefore an object of the present invention to provide an exhaust gas recirculation valve, the opening of which remains unchanged regardless of a change in the pressure of the air applied thereto and a change in the pressure of the exhaust gas fed thereinto, and which therefore can operate with a high degree of reliability.

In accordance with a first aspect of the present invention, there is provided an exhaust gas recirculation valve comprising: a housing which constructs a part of an exhaust gas path for receiving exhaust gas from an exhaust pipe of an internal combustion engine, the housing accommodating a valve mechanism for controlling the amount of flow of the exhaust gas passing therethrough; a fixed cylinder disposed in the housing; a movable cylinder assembly composed of at least one movable cylinder disposed in the fixed cylinder; a piston movably disposed in the movable cylinder assembly for controlling an opening of the valve mechanism; and a pressure applying mechanism for respectively applying pressure to the movable cylinder and the piston so as to move them through respective predetermined strokes.

In operation, the exhaust gas recirculation valve having the structure mentioned above can control its opening to one of a plurality of opening levels by moving the movable cylinder and piston through the respective predetermined strokes by means of the application of the pressure of air by the pressure applying mechanism, so as to provide a needed opening with reliability. Furthermore, by shortening the predetermined strokes of the movable components, there is provided the exhaust gas recirculation valve insensitive to a change in the pressure of air supplied by the pressure applying mechanism.

In accordance with a preferred embodiment of the present invention, the movable cylinder assembly comprises at least the first movable cylinder and a second movable cylinder disposed in the first movable cylinder. Furthermore, the piston is located in the second movable cylinder. The exhaust gas recirculation valve having the plural movable cylinders can provide a required plurality of opening levels.

Preferably, the exhaust gas recirculation valve further comprises a first pressure chamber surrounded by at least the fixed cylinder and the movable cylinder and a second pressure chamber surrounded by at least the movable cylinder and the piston. Furthermore, the pressure applying mechanism can apply pressure to each of the first and second pressure chambers. The pressure applied to the first pressure chamber moves the movable cylinder and the pressure applied to the second chamber moves the piston. Furthermore, when the pressure is applied to the second chamber, the movable cylinder and piston move in opposite directions. Therefore, the exhaust gas recirculation valve can provide fine opening levels. Alternatively, the exhaust gas recirculation valve further comprises a first pressure chamber surrounded by at least the fixed cylinder and the first movable cylinder, a second pressure chamber surrounded by at least the first and second movable cylinders, and a third pressure chamber surrounded by at least the second movable cylinder and the piston. Furthermore, the pressure applying mechanism can apply pressure to each of the first, second and third pressure chambers.

Preferably, the predetermined strokes of the movable cylinder assembly and piston are different from each other. Furthermore, when the movable cylinder assembly comprises a plurality of movable cylinders, predetermined strokes of the plural movable cylinders are different from each other. Therefore, varying combinations of the predetermined strokes can provide control of the valve opening at a number of opening levels.

Preferably, the predetermined stroke of the one movable cylinder with the largest surface to which pressure is applied by the pressure applying mechanism is the shortest. Therefore, the pressure applied to the movable cylinder having the shortest predetermined stroke, which is used for the fine adjustment of the valve opening, is the biggest. The valve mechanism does not suffer from vibration even if ripples in the pressure of the exhaust gas are applied to the valve mechanism since the force for holding the valve mechanism is big, and hence no collision between a valve member and a valve seat member in the valve mechanism takes place.

Preferably, at least one component among the movable cylinder assembly and the piston has two opposite surfaces to each of which pressure is applied. Furthermore, the pressure applied to each of the two opposite surfaces is controlled individually. Therefore, the movable component can move quickly in either direction. The impact of a physical shock generated after a movement of the component can be lessened.

According to a preferred embodiment of the present invention, portions, engageable with each other, of the valve mechanism and the piston are of generally spherical shape or of generally conical shape. Therefore, even if the direction in which the valve member of the valve mechanism is headed is different from that in which the piston is headed, due to a change in the pressure of air supplied by the pressure applying mechanism and a change of the flow rate of the exhaust gas, the engageable portions of the valve member and piston accommodate the difference between the directions.

Preferably, the exhaust gas recirculation valve further comprises a contact portion which abuts on the one movable cylinder of the movable cylinder assembly for limiting a range of motion of the movable cylinder to the predetermined stroke. After the movable cylinder moves through the predetermined stroke, it is reliably held by the contact portion.

Preferably, there is provided a lower pressure chamber, either to which pressure can be applied or which can be sealed, located under the fixed cylinder in the housing. Movements of the movable cylinder or piston can be controlled by controlling the pressure of air in the lower pressure chamber.

In accordance with a second aspect of the present invention, there is provided an exhaust gas recirculation valve comprising: a housing which constructs a part of an exhaust gas path for receiving exhaust gas from an exhaust pipe of an internal combustion engine, the housing accommodating a valve mechanism for controlling the amount of flow of the exhaust gas passing therethrough; a cylinder mounted on the housing; a first piston movably disposed in the cylinder for controlling an opening of the valve mechanism; a second piston movably disposed in the cylinder and engageable with the first piston, the second piston being able to slide in the cylinder through a predetermined stroke with respect to the first piston; and a pressure applying mechanism for respectively applying pressure to each of the first and second pistons so as to move them through respective predetermined strokes.

In operation, the pressure of air supplied by the pressure applying mechanism moves the first and second pistons through the respective predetermined strokes, thereby controlling the opening of the valve to one of plural opening levels. Thus, the exhaust gas recirculation valve provides a desired valve opening with reliability.

Preferably, the predetermined strokes of the first and second pistons are different from each other.

According to a preferred embodiment of the present invention, the predetermined stroke of the one piston with the largest surface to which pressure is applied by the pressure applying mechanism is the shortest.

Preferably, at least one of the first and second pistons has two opposite surfaces to each of which pressure is applied. Furthermore, the pressure applied to each of the two opposite surfaces is controlled individually.

According to a preferred embodiment of the present invention, portions, engageable with each other, of the valve mechanism and the first piston are of generally spherical shape or of generally conical shape.

Preferably, the exhaust gas recirculation valve further comprises a contact portion which abuts on the second piston for limiting a range of motion of the second piston to the predetermined stroke.

There may be provided a lower pressure chamber, either to which pressure can be applied or which can be sealed, located under the cylinder in the housing.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
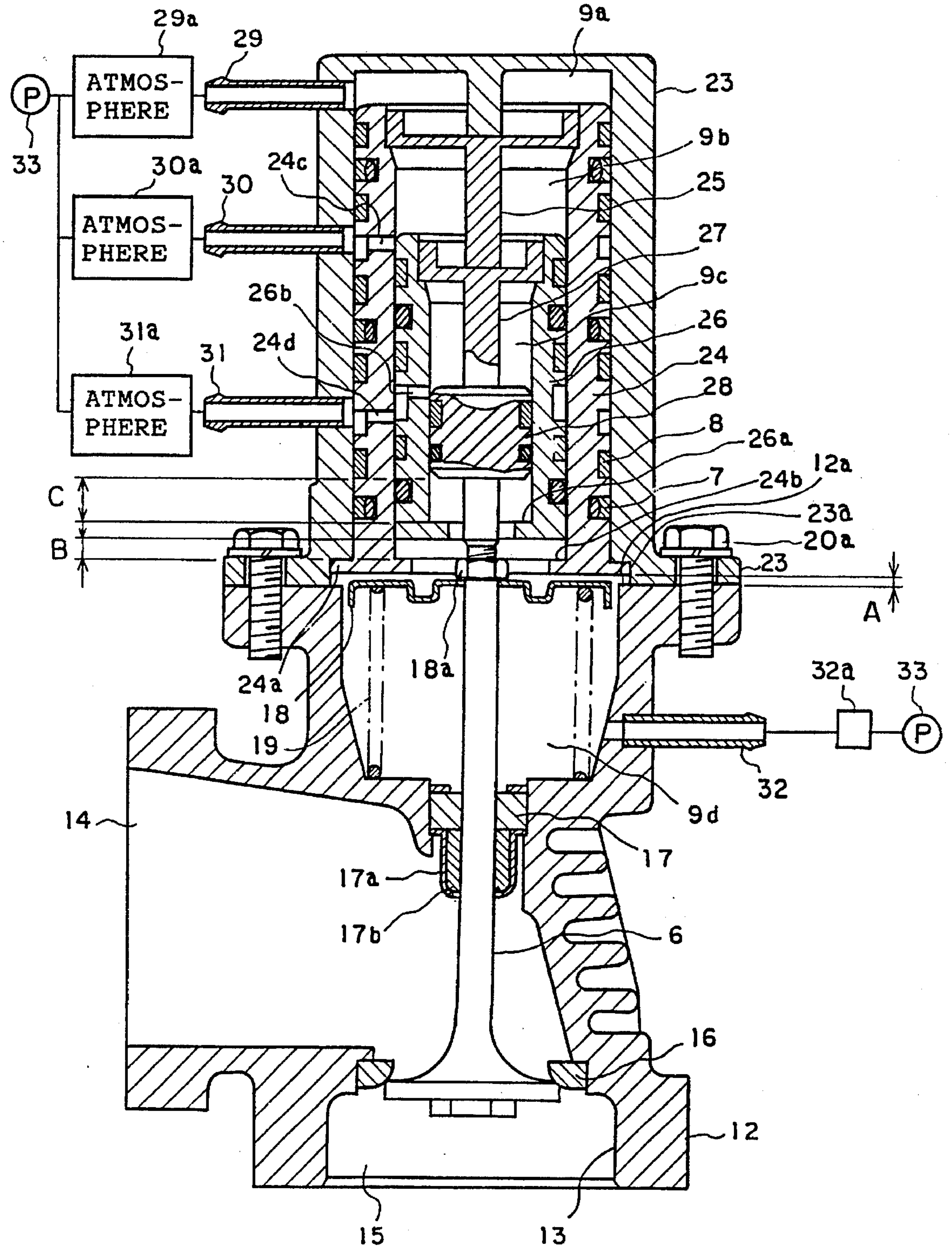
FIG. 1 is a cross-sectional view of an exhaust gas recirculation valve, which is closed, according to a first embodiment of the present invention.

Turning next to the drawing figures in which the same reference characters as in the figure of the prior art exhaust gas recirculation valve indicate identical or like elements, several alternate embodiments will now be described. In the following preferred embodiments, the description about the same elements as in the prior art valve will be omitted.

Figure 2:
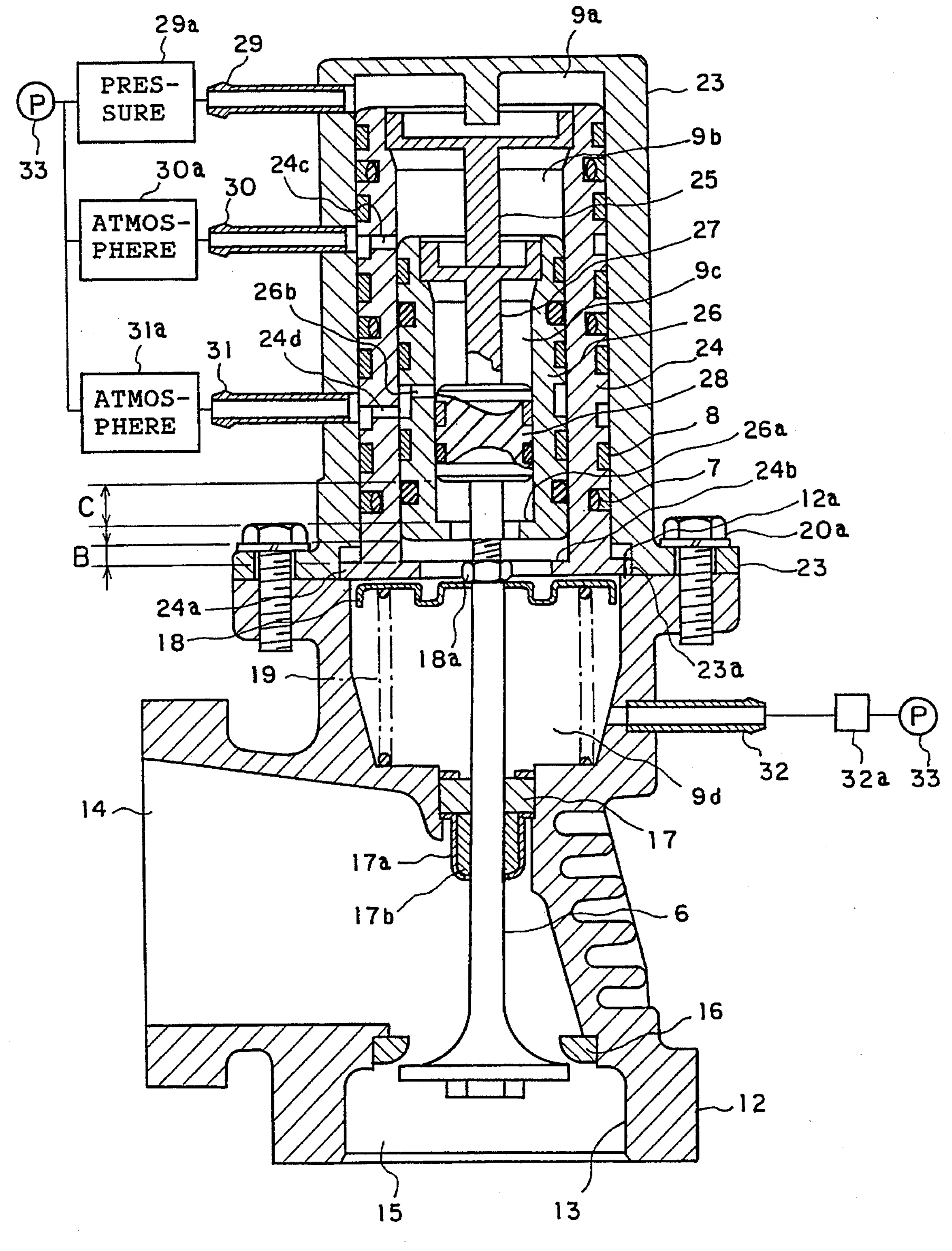
FIG. 2 is a cross-sectional view of the exhaust gas recirculation valve, in which a first movable cylinder is moved downward, according to the first embodiment of the present invention.
Figure 3:
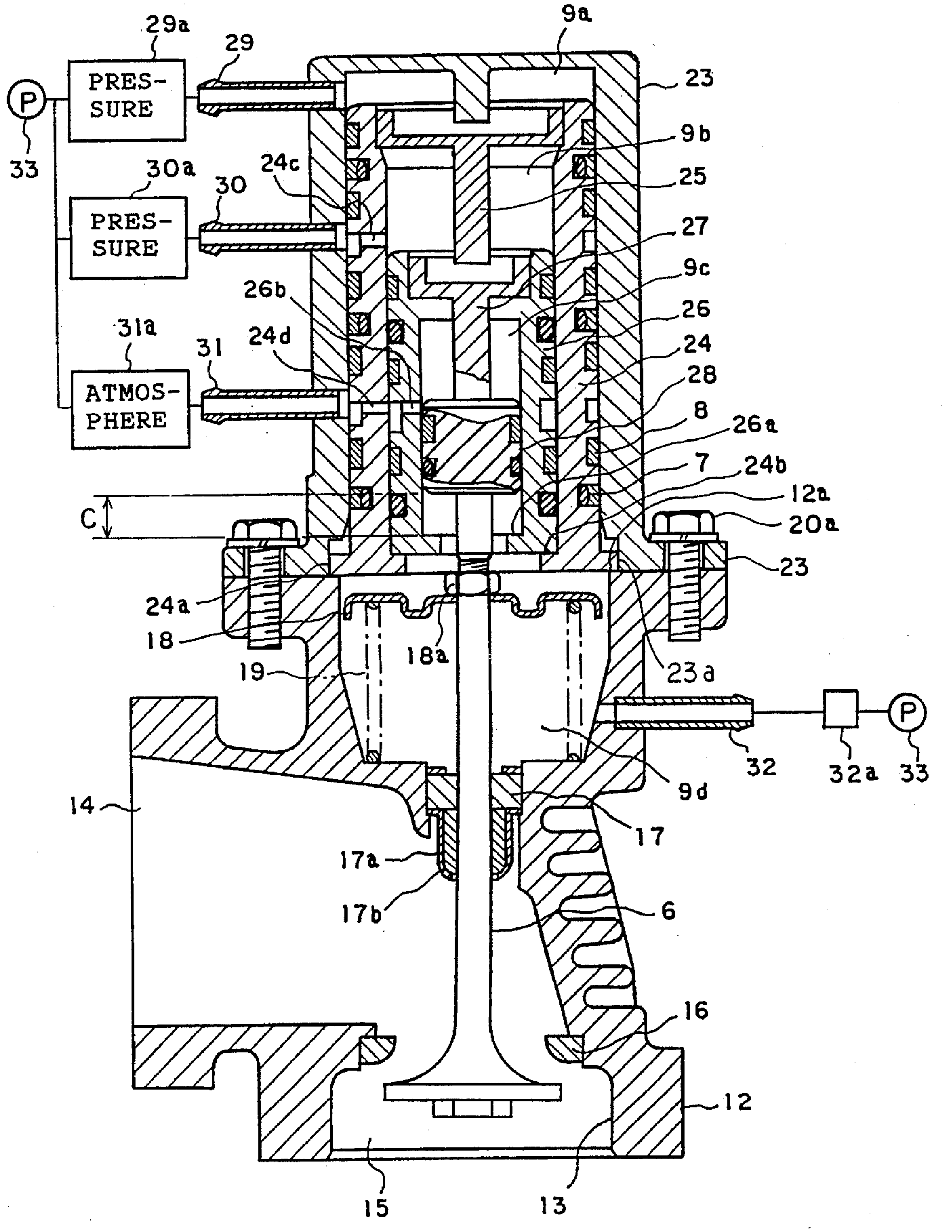
FIG. 3 is a cross-sectional view of the exhaust gas recirculation valve, in which both the first movable cylinder and a second movable cylinder are moved downward, according to the first embodiment of the present invention.

Referring now to FIGS. 1, 2, and 3, they illustrate a sectional view of an exhaust gas recirculation valve according to an embodiment of the present invention. FIG. 1 shows a state of the exhaust gas recirculation valve which is closed. FIG. 2 shows a state of the exhaust gas recirculation valve in which a first movable cylinder has been moved. FIG. 3 shows a state in which a second movable cylinder has been moved as well as the first movable cylinder. In these figures, reference numeral 23 denotes a cylindrical cylinder secured to the housing 12 with screws, and 24 denotes the cylindrical first movable cylinder movably disposed in the cylinder 23. A flange member 24*a* formed at the lower end of the first movable cylinder 24 is engaged in a large-diameter portion 23*a* of the cylinder 23. When the control valve 6 is closed, there is a space between the flange member 24*a* and the top surface 12*a* of the housing 12, as shown in FIG. 1. Therefore, the first movable cylinder 24 can slide within a range of motion A, i.e., through the predetermined stroke of the first movable cylinder 24.

Furthermore, reference numeral 26 denotes a second cylindrical movable cylinder movably disposed inside the first movable cylinder 24. The range of motion of the second movable cylinder 26 is limited by a first rod 25 disposed in the first movable cylinder 24 and a flange member 24*b* and hence the second movable cylinder 26 can slide within the range of motion B shown in FIG. 1, i.e., through the predetermined stroke of the second movable cylinder 26. Reference numeral 28 denotes a cylindrical piston movably disposed inside the second movable cylinder 26. The range of motion of the piston 28 is limited by a second rod 27 disposed in the upper portion of the second movable cylinder 26 and a flange member 26*a* formed at the lower end of the second movable cylinder 26 and hence the piston 28 can slide within the range of motion C, i.e., through the predetermined stroke of the piston 28. In order to provide various travels of the control valve 6 by combinations of the strokes A, B, and C, the strokes A, B, and C are so determined as to be different from each other, as will be explained later.

Reference numeral 29 denotes a first pressure applying port which connects a pressure chamber 9*a* surrounded by at least the cylinder 23 and first movable cylinder 24 with a valve 29*a*, 30 denotes a second pressure applying port which connects a pressure chamber 9*b* surrounded by at least the first and second movable cylinders 24 and 26 with a valve 30*a* by way of a small-diameter penetrating hole 24*c* in the first movable cylinder 24, and 31 denotes a third pressure applying port which connects a pressure chamber 9*c* surrounded by at least the second movable cylinder 26 and piston 28 with a valve 31*a* by way of a small-diameter penetrating hole 24*d* in the first movable cylinder 24 and a small-diameter penetrating hole 26*b* in the second movable cylinder 26. Each of the valves 29*a*, 30*a*, and 31*a* is adapted to receive air from the pressure source 33 in the automobile. Furthermore, reference numeral 32 denotes a fourth pressure applying port which connects a sealed chamber 9*d* as the lowest pressure chamber formed between the lower ends of the movable cylinders 24 and 26 and piston 28 and the housing 12 with a valve 32*a*. The valve 32*a* is also adapted to receive air from the pressure source 33 in the automobile.

Each of the valves 29*a*, 30*a*, and 31*a* is adapted to operate in either a first mode in which each valve connects the corresponding one of the pressure chambers 9*a*, 9*b*, and 9*c* with the atmosphere or a second mode in which each valve connects the corresponding one of the pressure chambers 9*a*, 9*b*, and 9*c* with the pressure source in order to supply air at a positive pressure to the corresponding one of the pressure chambers. The valve 32*a* is adapted to operate in any one of a first mode in which it connects the sealed chamber 9*d* with the atmosphere, a second mode in which the valve connects the sealed chamber 9*d* with the pressure source in order to supply air at a positive pressure to the sealed chamber, and a third mode in which the valve is closed.

FIG. 1 shows a state of the EGR having the aforementioned structure, in which all the valves 29*a*, 30*a*, 31*a*, and 32*a* each connect the corresponding pressure applying port with the atmosphere. In this state, the control valve 6 is pushed in an upward direction in the figure by the pressure of the spring 19 and therefore the valve member constructed of the valve seat 16 and control valve 6 is closed while the piston 28 is pushed upward. As a result, the piston 28 pushes the second movable cylinder 26 upward by means of the second rod 27 and the second movable cylinder 26 pushes the first movable cylinder 24 by means of the first rod 25. FIG. 2 shows a state of the EGR valve in which only the valve 29*a* has gone into the second mode, i.e., the pressure applying mode while the other valves remain their modes shown in FIG. 1. The pressure of air applied to the pressure chamber 9*a* pushes the first movable cylinder 24 downward as far as the cylinder 24 comes into contact with the upper end face 12*a* of the housing 12; the first movable cylinder 24 is pushed down through the stroke A. As a result, the first movable cylinder 24 pushes the control valve 6 downward through the stroke A by means of the first rod 25, second movable cylinder 26, second rod 27, and piston 28, and then the valve member is opened. FIG. 3 shows a state of the EGR valve in which the valve 30*a* has gone into the second mode, i.e., the pressure applying mode as well as the valve 29*a* while the other valves remain their modes shown in FIG. 1. When the pressure of air is applied to the pressure chamber 9*b* as well as the pressure chamber 9*a*, the second movable cylinder 26 is pushed downward through the stroke B and hence the second movable cylinder 26 further pushes the control valve 6 downward through the stroke B by means of the second rod 27 and piston 28. As a result, the travel of the control valve 6 reaches the sum of the strokes or (A+B), and the opening of the EGR valve in the state of FIG. 3 is greater than that in the state of FIG. 2.

Furthermore, when the valve 31*a* goes into the second mode, i.e., the pressure applying mode as well as the valves 29*a* and 30*a*, the piston 28 is also moved. As a result, the travel of the control valve 6 reaches the sum of the strokes or (A+B+C) and the opening EGR valve runs into the maximum value corresponding to the travel (A+B+C).

If an equality $A<B<C$ and a relationship $(A+B)\neq C$ are established among the stokes A, B, and C, as shown in FIGS. 1, 2, and 3, eight opening levels corresponding to combinations of the strokes, i.e., 0, A, B, C, A+B, A+C, B+C, and A+B+C, between the full open state, in which the EGR valve is fully opened, and the close state, in which the EGR valve is fully closed, can be set for the EGR valve. Therefore, only controlling the pressure of the air in each of the pressure chambers 9*a*, 9*b*, and 9*c* can provide the eight opening levels with high accuracy regardless of the pressure of the air in the pressure source 33 and changes in the pressure.

The valve 32*a* connects the corresponding pressure applying port 32 with the atmosphere under normal conditions. The valve 32*a* goes into the close mode in which it is closed only when at least one of the movable cylinders and piston is moved in the downward direction. In the close mode, the volume of the sealed chamber 9*d* is reduced due to the movement of the moving component and hence the pressure of the air in the chamber rises, with the result that the velocity of the moving component is decreased. Therefore, the impact noise and impact force due to the collision between the moving component and the fixed component can be reduced.

In cases where the EGR valve comprises a plurality of movable cylinders and therefore the moments of inertia of the moving components are big, when the EGR valve changes from the operating state in which it is opened to the close state in which it is fully closed, moving or returning all the movable components to their original positions by using the force of the spring 19 requires a lot of time. However, according to this embodiment mentioned above, since the valve 32*a* can go into the pressure applying mode when the EGR valve changes from the operating state to the close state, air at a positive pressure is applied to the sealed chamber 9*d* and hence the moving components can be returned quickly. That is, the forces required for downward movements of the control valve 6 and the times required for upward movements, i.e., returns of the control valve 6 depend on the elastic force of the spring 19, though switching between the modes of the valve 32*a* can alter the pressure of the air in the sealed chamber 9*d* and therefore adjust the forces and times required for movements of the control valve 6.

Furthermore, according to this embodiment, the inequality A<B<C is established among the strokes A, B, and C of the movable cylinders and piston, that is, the stroke of the first movable cylinder 24 having the largest area for receiving the air at a pressure is the minimum one A, as mentioned above. Since the pressure applied to the first movable cylinder 24 having the largest pressure receiving area holds the control valve 6 in position when the opening of the EGR valve is the smallest, that is, the first movable cylinder 24 is moved through the stroke A, the force for holding the control valve 6 reaches the maximum. Therefore, the control valve 6 does not vibrate even if ripples in the pressure of the exhaust gas are applied to the control valve 6 because the force for holding the control valve 6 is big, and hence no collision between the control valve 6 and the valve seat 16 takes place.

As previously explained, the EGR valve of this embodiment provides the eight opening levels. The number of opening levels can be altered by increasing or decreasing the number of the movable components including movable cylinders and a piston. If the number of the movable components is N, the number of opening levels is equal to the square of N. An increase in the number of opening levels can provide more fine control of the opening of the EGR valve which approximates to continuous control of the opening of the EGR valve.

In this first embodiment, the valves 29*a*, 30*a*, and 31*a* have the two modes. Alternatively, the valves are adapted to operate in each of the three modes including the close mode.

As previously mentioned, the EGR valve according to the first embodiment comprises the movable cylinders disposed in the fixed cylinder, and the piston disposed in the innermost movable cylinder located in the fixed cylinder. Furthermore, these movable components can be respectively moved through the different predetermined strokes by means of pressure and can be held in position. Therefore, during the interval that the movable components are held in position, the opening of the EGR valve is not altered even if the pressure of the air applied to each of the pressure chambers varies. Thus, the present invention makes it possible to control the position of the control valve with high accuracy and provide multilevel control of the opening which is not inferior to continuous control of the opening. Particularly, even if the EGR valve is open at a fine opening level, which is of extreme importance with the EGR valve, no vibration takes place due to ripples in the pressure of the exhaust gas. Thus, the present invention can provide the high-performance EGR valve with a high degree of reliability. Furthermore, since the velocities of the movable components can be controlled, the occurrence of impact noise and time lag of controlling can be prevented.

Next, the description will be directed to a second embodiment of the present invention. FIGS. 4 to 7 show cross-sectional views of an exhaust gas recirculation valve according to the second embodiment of the present invention. The opening of the control valve 6 is increased in the order of FIGS. 4, 5, 6, and 7. The same elements as in the first embodiment are designated by the same reference numerals and the description about the elements will be omitted hereinafter. In these figures, reference numeral 101 denotes a first piston which can come into contact with the upper portion of the control valve 6, 102 denotes a second piston which can be engaged with the first piston 101 and a cylinder head which will be explained later and which can be slidably connected with the first piston 101, 103 denotes a second spring located on the upper face of the second piston, 104 denotes a fixed cylinder in which the first and second pistons 101 and 102 are slidably disposed, 105 denotes the cylinder head secured to the upper flange member of the cylinder 104 with fastening bolts 133, 106*a* denotes a first pressure chamber surrounded by at least the first piston 101, second piston 102, and cylinder 104, and 106*b* denotes a second pressure chamber surrounded by at least the second piston 102, cylinder 104, and cylinder head 105. The first and second pistons 101 and 102 are provided with the needed number of the sealing members 7 each for sealing each of the pressure chambers and the piston rings 8 each for providing smoothly sliding movements of the respective pistons.

Furthermore, the first piston 101 is provided with a connecting hook 101*a* which is engageable with the second piston, and the second piston is provided with a stopper 102*a* which is formed at the lower portion thereof and which is engageable with the connecting hook 101*a*. The second piston 102 is provided with a connecting hook 102*b* which is formed at the upper portion thereof and which is engageable with the cylinder head 105, and the cylinder head 105 is provided with a stopper 105*a* which is formed at the lower portion thereof and which is engageable with the connecting hook 102*b* of the second piston 102. Reference character D indicates the maximum distance between the stopper 105*a* formed at the lower portion of the cylinder head 105 and the connecting hook 102*b* formed at the upper portion of the second piston 102. Reference character E indicates the maximum distance between the stopper 102*c* formed at the upper portion of the second piston 102 and the stopper 105*a* formed at the lower portion of the cylinder head. Reference character F indicates the maximum distance between the connecting hook 101*a* formed at the upper portion of the first piston 101 and the stopper 102*a* formed at the lower portion of the second piston 102.

Furthermore, reference numeral 107 denotes a first pressure applying port connected with the first pressure chamber 106*a* for feeding air at a pressure into the first chamber, 108 denotes a second pressure applying port connected with the second pressure chamber 106*b* for feeding air at a pressure into the second chamber, 105*b* denotes a small-diameter portion of the cylinder head 105 having a penetrating hole through which the second pressure applying port 108 is communicated with the second pressure chamber 106*b*, and 101*b* denotes a small-diameter portion of the first piston 101 having a penetrating hole through which the first pressure applying port 107 is communicated with the first pressure chamber 106*a*.

Reference numeral 109 denotes a pump disposed as an air pressure source for driving the exhaust gas recirculation valve. A positive-pressure compressor mounted in an automobile with the EGR valve can serve as such the pump. Furthermore, reference numerals 110 and 111 denote solenoid valves respectively connected with the first and second pressure applying ports 107 and 108 for respectively on-off controlling the application of pressure to the first and second pressure chambers 106*a* and 106*b*.

The first and second pressure applying ports 107 and 108 have screw holes, and pressure paths connected with the solenoid valves 111 and 110 are respectively screwed into the screw holes of the pressure applying ports in order to seal the respective pressure chambers.

Figure 4:
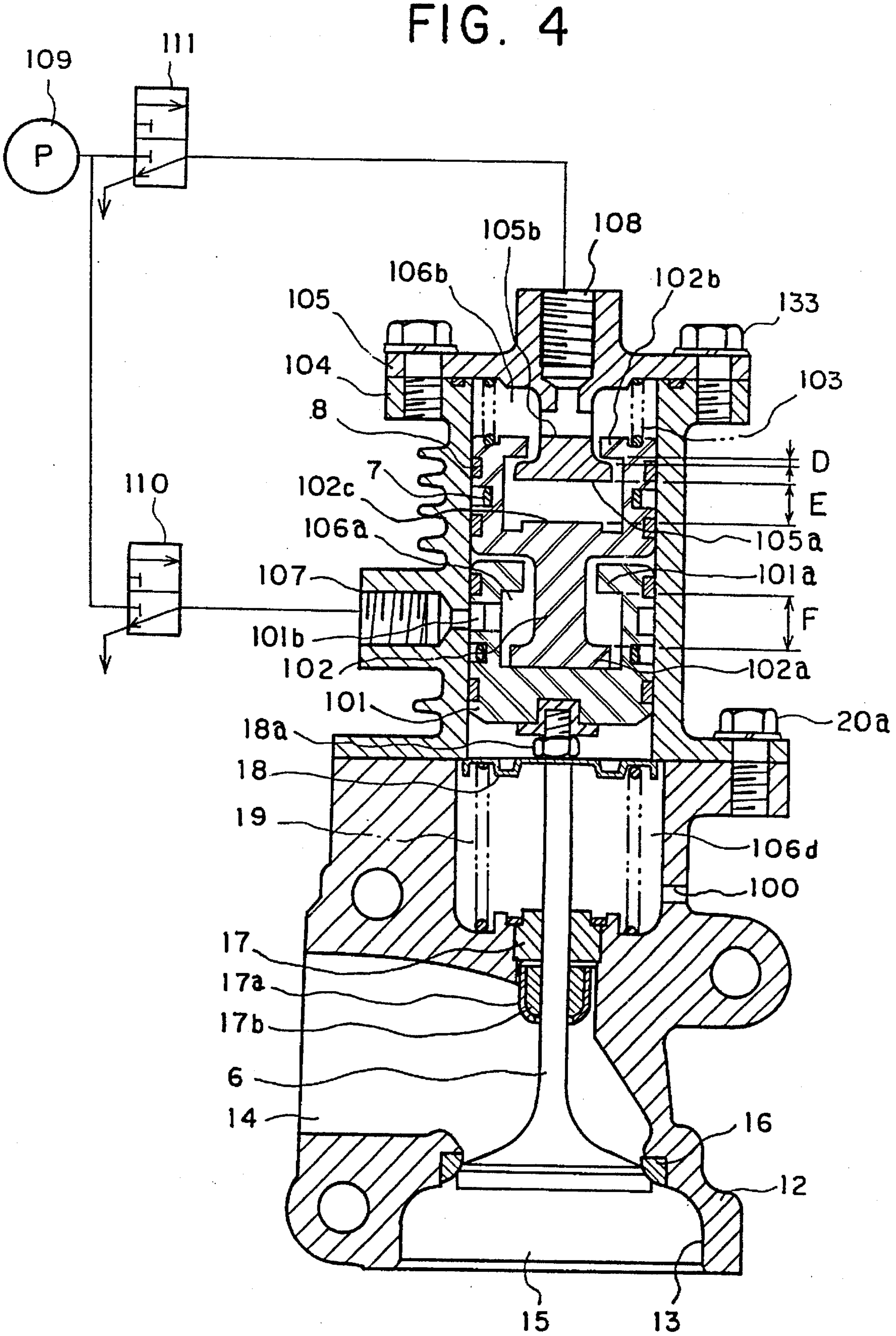
FIG. 4 is a cross-sectional view of an exhaust gas recirculation valve, which is closed, according to a second embodiment of the present invention.

Next, the description will be directed to the operation of the exhaust gas recirculation valve having the aforementioned structure. As shown in FIG. 4, when air at a positive pressure is not applied to both of the first and second pressure chambers 106*a* and 106*b*, the control valve 6 of the exhaust gas recirculation valve is closed and hence the exhaust gas path 13 is interrupted.

Figure 5:
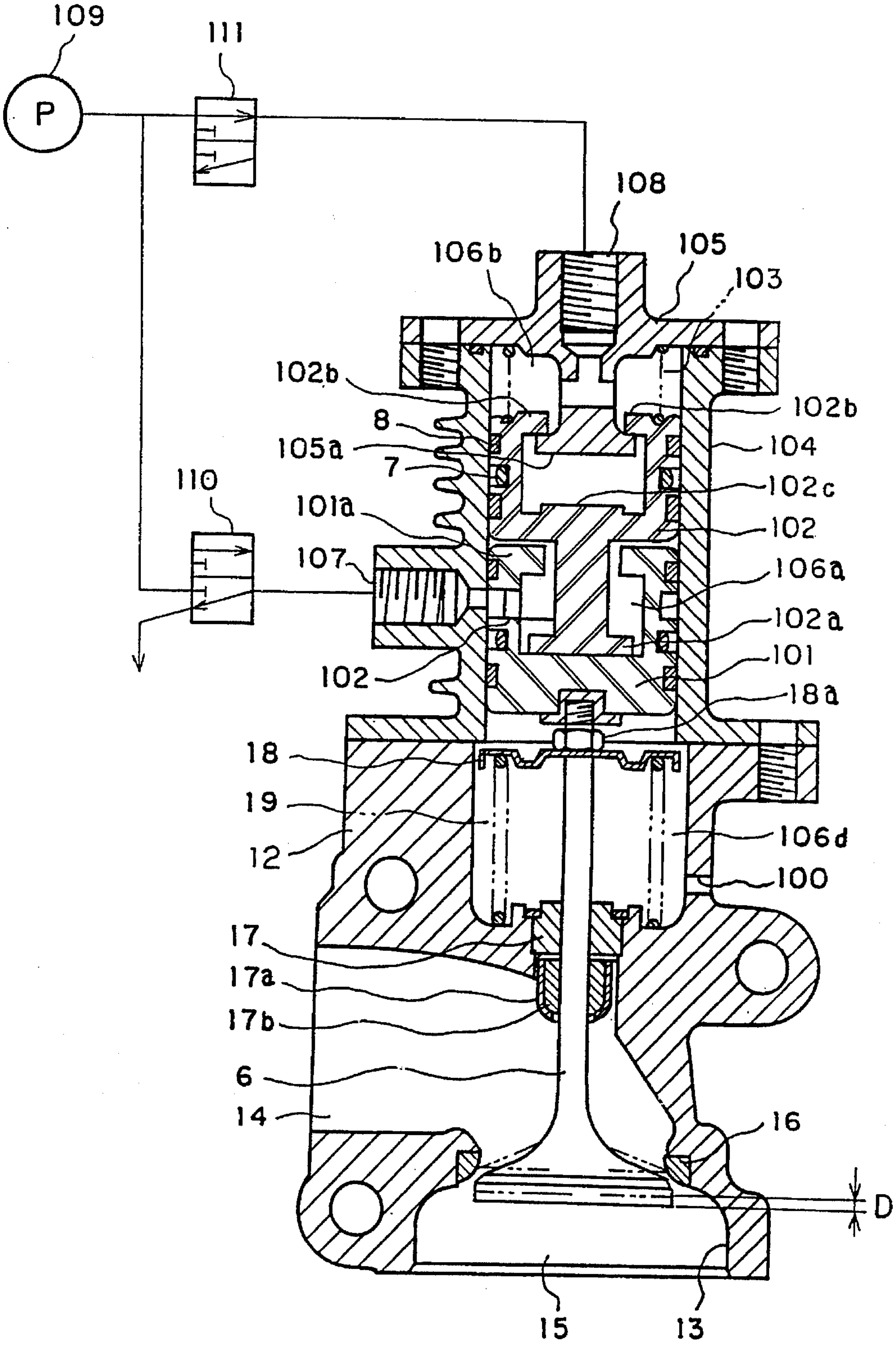
FIG. 5 is a cross-sectional view of the exhaust gas recirculation valve, in which a first piston is pushed downward due to the downward movement of a second piston, according to the second embodiment of the present invention.

FIG. 5 shows a state of the EGR valve in which the solenoid valve 111 is on and the solenoid valve 110 is off. When air at a positive pressure is applied to only the second pressure chamber 106*b*, the pressure in the second pressure chamber 106*b* exceeds the elastic force of the first spring 19. As a result, the second piston 102 pushes the first piston 101 and control valve 6 downward and then the control valve 6 is opened. After that, the connecting hook 102*b* at the upper portion of the second piston 102 engages with the connecting hook 105*a* of the cylinder head 105 and the second piston 102 is stopped. Therefore, the opening of the control valve 6 is limited to an opening level corresponding to the distance D.

Figure 6:
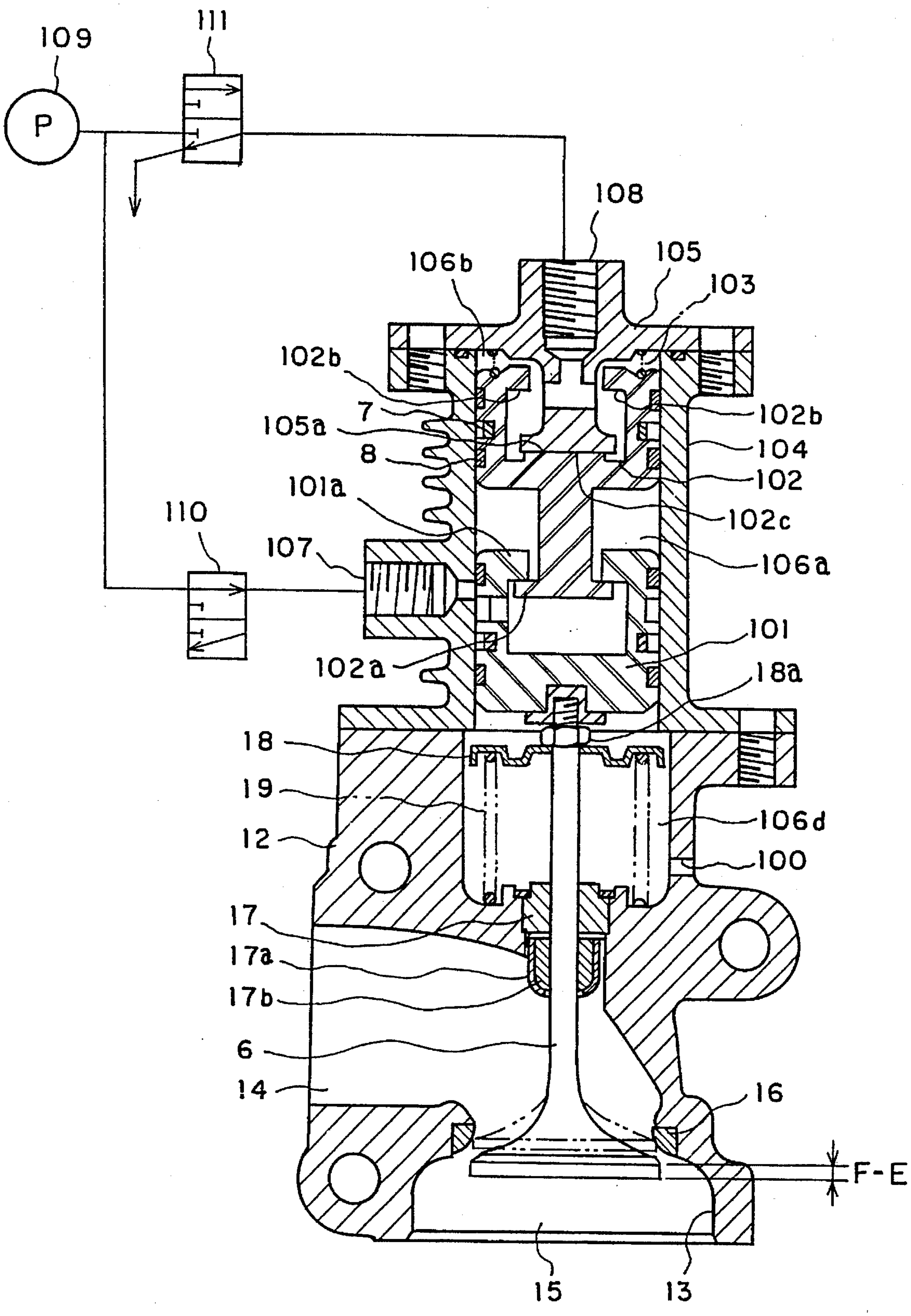
FIG. 6 is a cross-sectional view of the exhaust gas recirculation valve, in which the first piston is pushed downward and the second piston is pushed upward, according to the second embodiment of the present invention.

FIG. 6 shows a state of the-EGR valve in which the solenoid valve 110 is on and the solenoid valve 111 is off. Air at a positive pressure is applied to only the first pressure chamber 106*a*, and the second pressure chamber 106*b* is communicated with the atmosphere. In this case, the pressure of the air in the first pressure chamber 106*a* exceeds the elastic force of the second spring 103. As a result, the second piston moves in an upward direction in the figure and comes into contact with the stopper 105*a* of the cylinder head 105, and it is then stopped. Furthermore, since the pressure of the air in the first pressure chamber 106*a* is greater than the elastic force of the first spring 19, the first piston moves in a downward direction in the figure and comes into contact with the stopper 102*a* of the second piston 102. Thus, the control valve 6 is moved downward through the difference (F–E) between the travels of the first and second pistons 101 and 102. Finally, the control valve 6 is opened.

Figure 7:
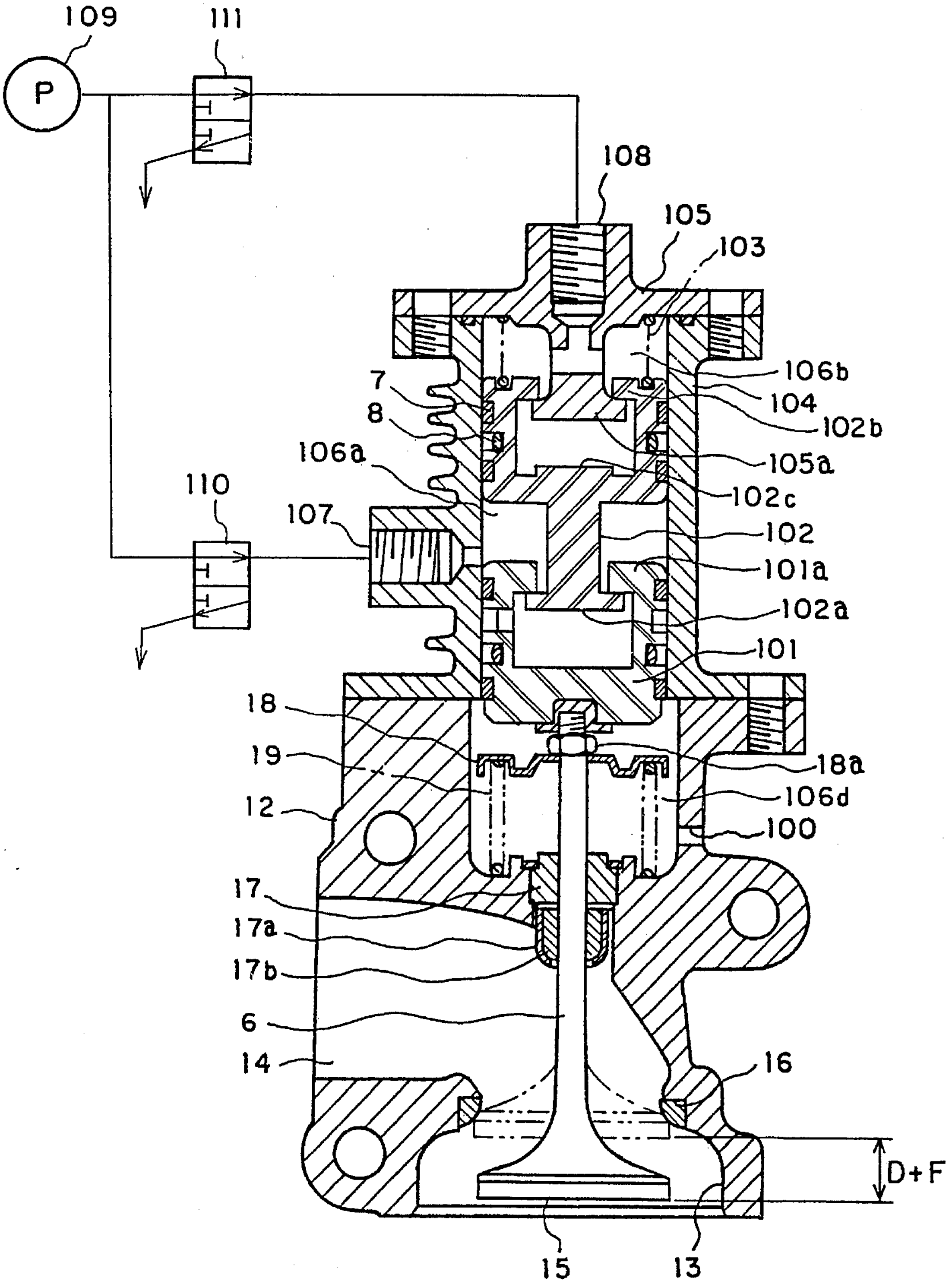
FIG. 7 is a cross-sectional view of the exhaust gas recirculation valve, in which both of the first and second pistons are pushed downward due to the pressure applied to the respective pressure chambers, according to the second embodiment of the present invention.

FIG. 7 shows a state of the EGR valve in which both of the solenoid valve 110 and 111 are on. Air at a positive pressure is applied to both of the first and second pressure chambers 106*a* and 106*b*. In this case, since the pressure of the air above the second piston 102 is balanced with that of the air under the second piston 102, the second piston is pushed downward due to the elastic force of the second spring 103. Simultaneously, the first piston 101 is moved in the downward direction in the figure due to the difference between the pressure of the air in the first pressure chamber 106*a* and atmospheric pressure, because the chamber 106*d* under the first piston 101 is communicated with the atmosphere via a port 100 in the housing 12. After the connecting hook 101*a* of the first piston 101 has come into contact with the stopper 102*a* at the lower portion of the second piston 102 and the connecting hook 102*b* at the upper portion of the second piston 102 has come into contact with the stopper 105*a* at the lower portion of the cylinder head 105, the first and second pistons are stopped. As a result, the control valve 6 is moved downward through the travel (D+F) and is fully opened.

As previously mentioned, only the elastic force of the second spring 103 contributes the downward force exerted on the second piston 102 in the above case shown in FIG. 7. Even if the resistance to the sliding movement of the second piston 102, which are caused by the sealing member 7 and piston ring 8, is greater than the downward force, the second piston 102 can be forcefully pushed downward due to the downward force exerted on the first piston 101 because the second piston 102 is engaged with the first piston 101. That is, even if the elastic force of the second spring 103 is relatively small and the resistance to the sliding movement of the second piston is increased due to the thermal expansion of the sealing member 7 or piston ring 8 or the like, the second piston 102 can be moved to a certain position with reliability and the control valve 6 can be opened. There is a space, through which air can be passed, between the piston ring 8 and the cylinder 104. The pressure chambers are sealed by the sealing members 7.

As previously explained, the exhaust gas recirculation valve of the second embodiment provides two-level control of its opening in a range of fine opening levels which is of extreme importance from the view point of functions of the exhaust gas recirculation system. One of the two opening levels can be controlled by moving the two pistons in opposite directions. The exhaust gas recirculation valve of this embodiment makes it possible to provide four-position control including the two positions of the control valve which correspond to its fine opening range by utilizing the relative difference between the distances traveled by the two pistons, i.e., the difference between the strokes of the two pistons. Thus, the exhaust gas recirculation valve can provide four-level opening control including full open and full close for the control valve, and particularly, can easily perform control of the two positions of the control valve in the range of fine opening levels by moving the two pistons in opposite directions.

Furthermore, the exhaust gas recirculation valve can provide precise opening levels for the control valve regardless of a change in the pressure of the air fed by the pressure source and a change in the pressure of the exhaust gas. Thus, exhaust gas recirculation control can be performed with high accuracy and high reliability.

Figure 8:
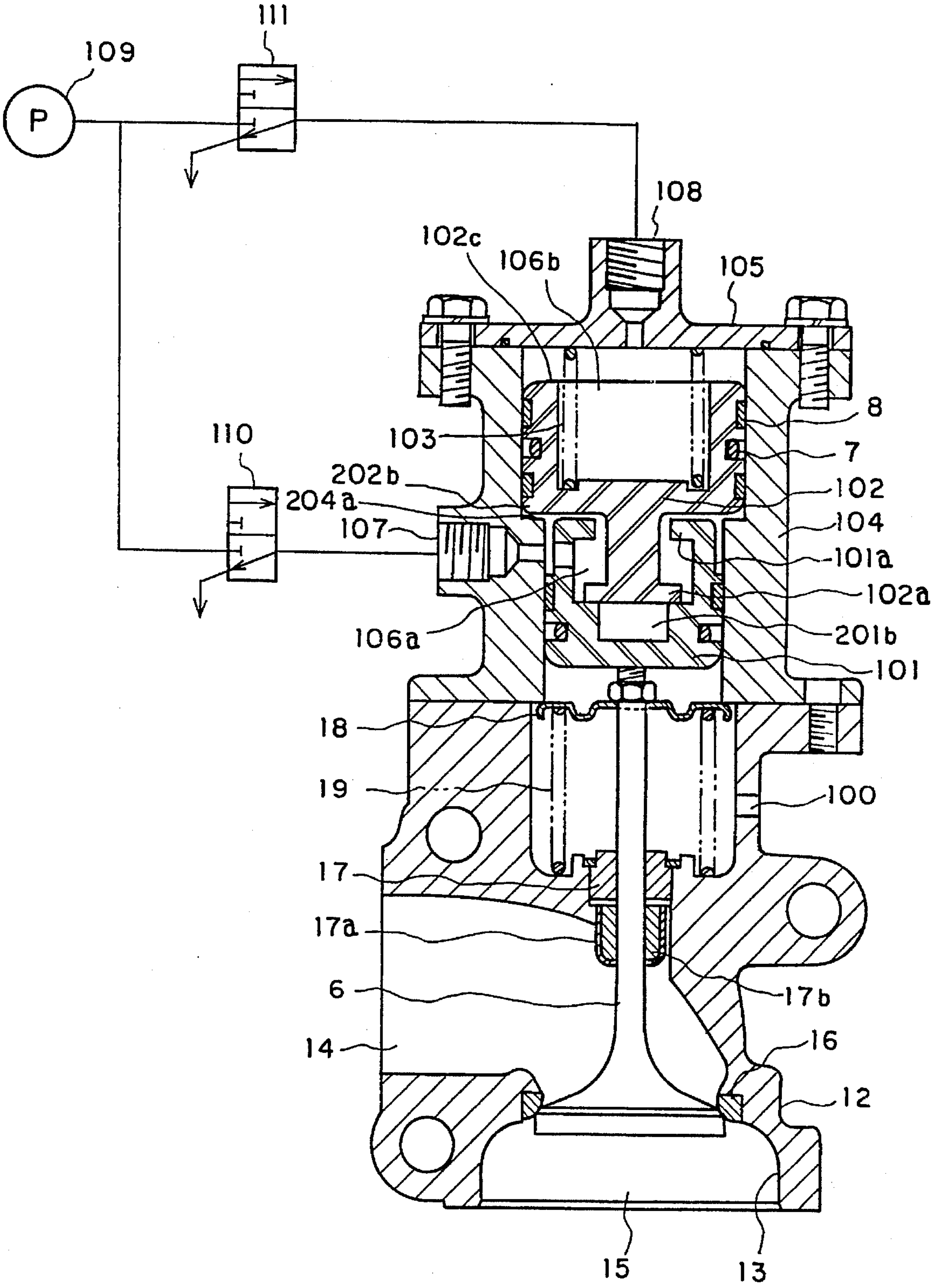
FIG. 8 is a cross-sectional view of an exhaust gas recirculation valve according to a third embodiment of the present invention.
Figure 9:
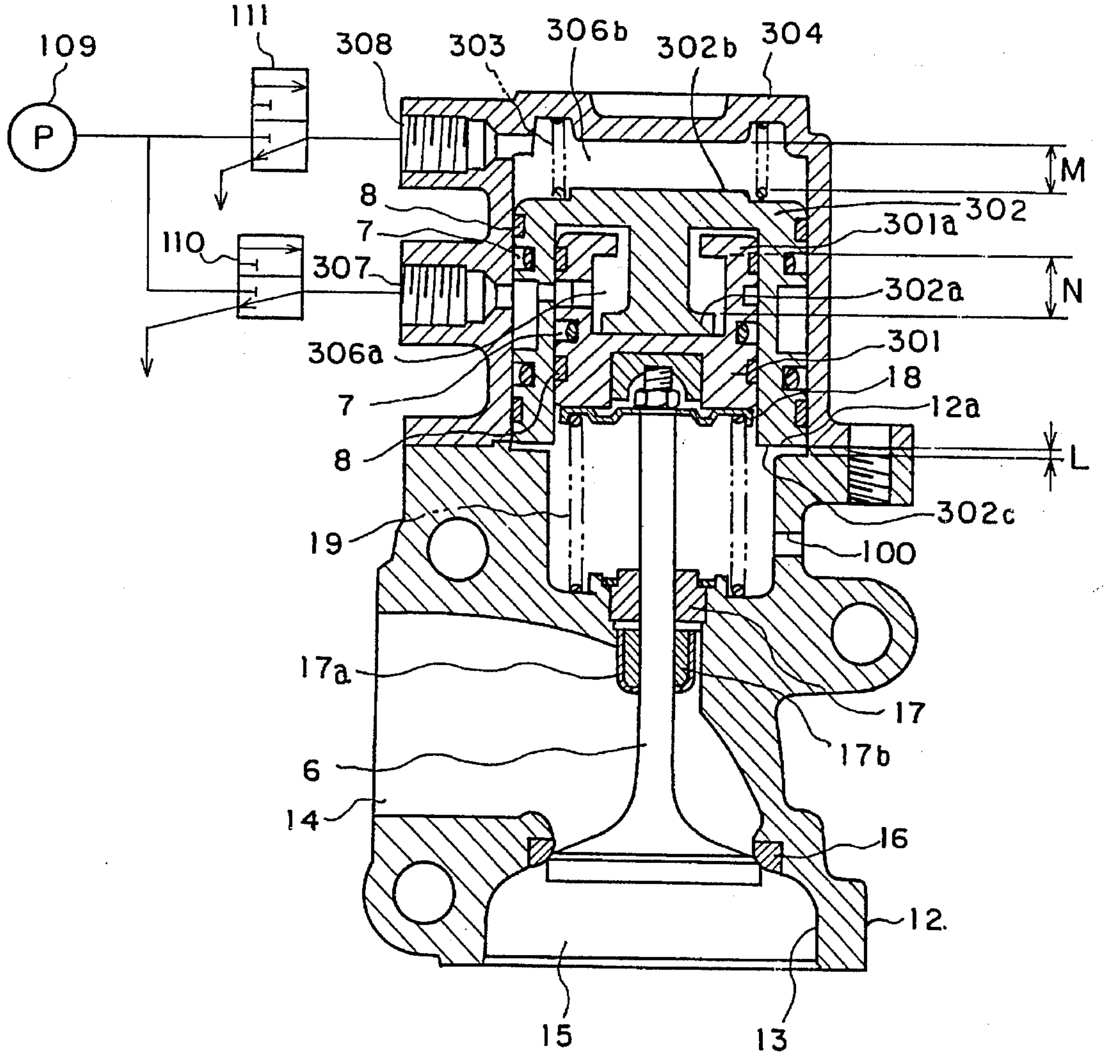
FIG. 9 is a cross-sectional view of an exhaust gas recirculation valve, which is closed, according to a fourth embodiment of the present invention.
Figure 10:
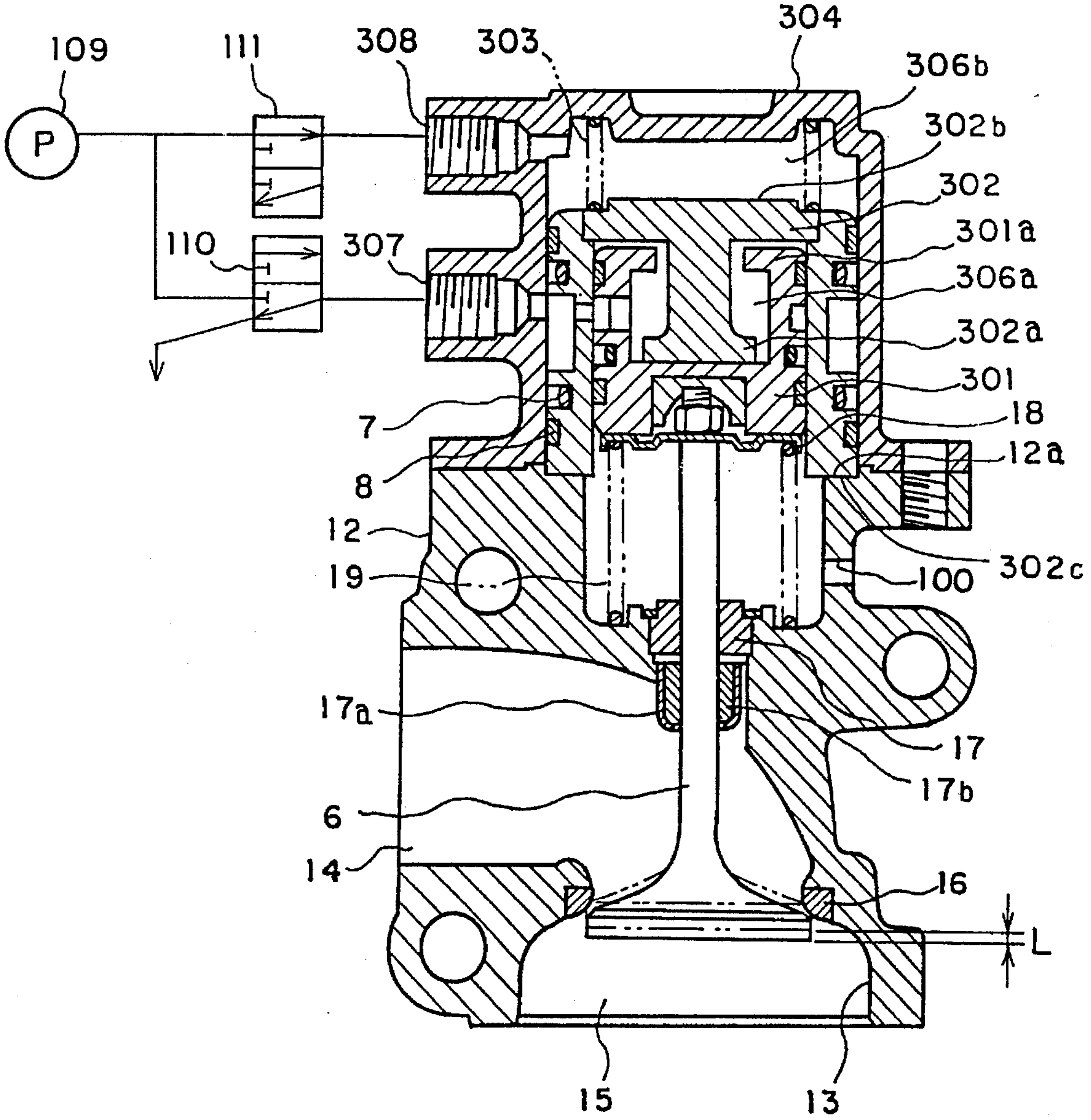
FIG. 10 is a cross-sectional view of the exhaust gas recirculation valve, in which a first piston having a second piston disposed therein is pushed downward, according to the fourth embodiment of the present invention.

Next, the description will be directed to a third embodiment of the present invention. FIG. 8 shows a cross-sectional view of an exhaust gas recirculation valve according to the third embodiment. In the figure, the same elements as in the second embodiment are designated by the same reference numerals and the description about the elements will be omitted hereinafter. According to the third embodiment, the diameter of the first piston 101 is different from that of the second piston 102. Furthermore, the travel in a downward direction of the second piston 102 is limited by the contact between the shoulder portion 202*b* thereof and the stair portion 204*a* of the fixed cylinder 104, and the travel in an upward direction of the second piston 102 is limited by the contact between the cylinder head 105 secured to the cylinder 104 and the top face 102*c* of the second piston.

Furthermore, the first piston 101 is provided with a cavity portion 201*b* formed inside the piston itself, thereby facilitating control of the pressure of the air in the pressure chamber 106*a*.

In addition, the diameter of the second piston 102 is greater than that of the second piston according to the aforementioned second embodiment. Therefore, when the solenoid valve 111 is switched to apply air at a positive pressure to the pressure chamber 106*b* and hence the second piston 102 is in contact with the stair portion 204*a* of the cylinder 104, that is, when the control valve 6 is open at the minimum opening level, the pressure exerted on the second piston 202 is greater than that in the second embodiment. Thereby, vibration or the like of the control valve 6 can be prevented more effectively.

Furthermore, unlike the second embodiment, the exhaust gas recirculation valve does not need the stopper 105*a*, as shown in FIG. 4, at the lower portion of the cylinder head. Therefore, the shape of the cylinder head 105 can be simplified and hence the molding of the cylinder head and the assembly of the EGR valve are easily performed.

Referring now to FIGS. 9 to 12, they illustrate cross-sectional views of an exhaust gas recirculation valve according to a fourth embodiment of the present invention. In these figures, the same elements as in the first embodiment are designated by the same reference numerals and the description about the elements will be omitted hereinafter. Reference numeral 301 denotes a first piston, 302 denotes a second piston accommodating the first piston 301 which can slide therein and having a connecting portion engageable with the first piston 301, 304 denotes a cylinder accommodating the second piston 302 which can slide therein, and 303 denotes a second spring disposed between the second piston 302 and the cylinder 304.

Furthermore, reference numeral 301a denotes a connecting hook disposed at the upper portion of the first piston 301, and 302*a* denotes a stopper projecting from the upper portion of the second piston 302 in a downward direction. The stopper 302*a* can come into contact with the connecting hook 301*a* at the end part thereof so as to limit the travels of the first and second pistons. Reference numeral 302*b* denotes the top face of the second piston 302, which can abut on the cylinder 304 so as to limit the travel of the second piston 302 itself, and 302*c* denotes the bottom face of the second piston 302, which can abut on the stopper 12*a* of the housing 12 so as to limit the travel of the second piston 302 itself.

Figure 11:
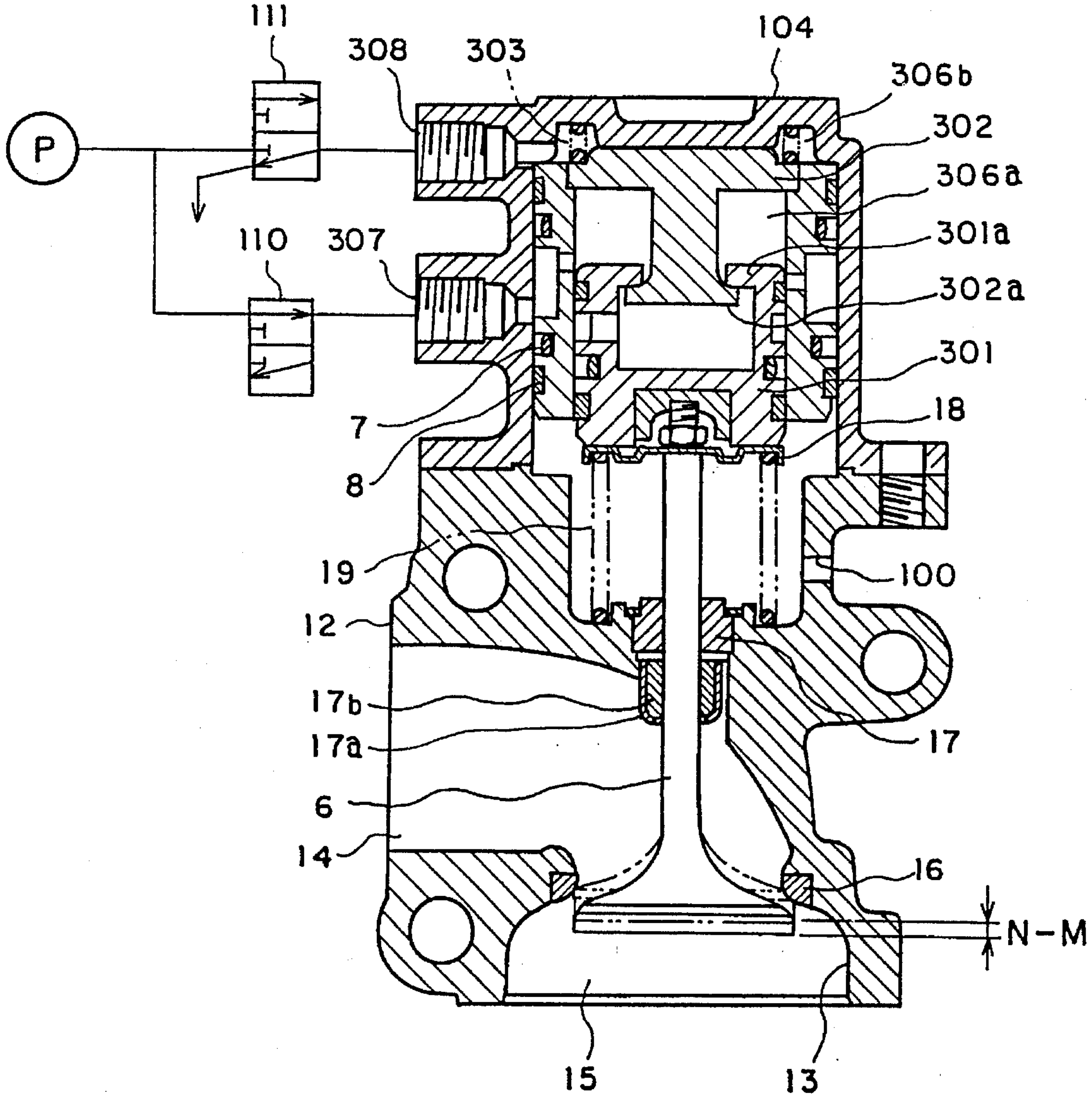
FIG. 11 is a cross-sectional view of the exhaust gas recirculation valve, in which the first piston is pushed downward and a second piston is pushed upward, according to the fourth embodiment of the present invention.

FIG. 11 shows a state of the EGR valve in which the solenoid valve 110 is on and the solenoid valve 111 is off. Air at a positive pressure is applied to only the first pressure chamber 306*a*, and simultaneously, the second pressure chamber 306*b* is communicated with the atmosphere. In this case, when the upward force exerted on the second piston 302 which is caused by the pressure difference between the first and second pressure chambers 306*a* and 306*b* exceeds the elastic force of the second spring 303, the second piston 302 is pushed upward. Then, the second piston 302 comes into contact with the cylinder head 305 and is stopped. Furthermore, when the downward force exerted on the first piston 301 which is caused by an increase in the pressure in the first pressure chamber 306*a* exceeds the elastic force of the first spring 19, the first piston 301 is pushed downward. Then, the connecting hook 301*a* of the first piston comes into contact with the stopper 302*a* of the second piston 302 and therefore the first piston 301 is stopped. As a result, the control valve 6 is moved downward through the difference (N–M) of the strokes of the first and second pistons 301 and 302 and is opened.

Figure 12:
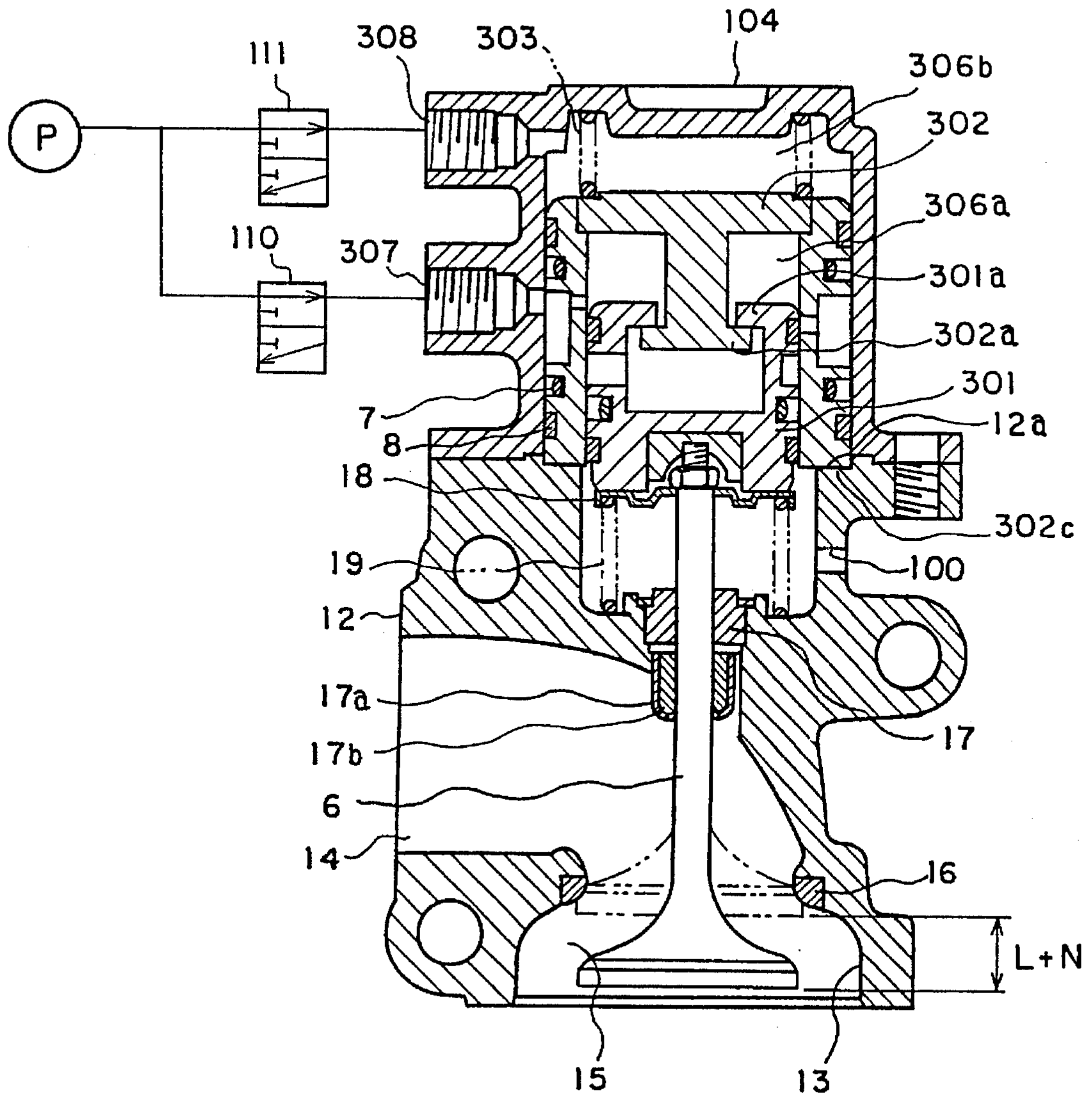
FIG. 12 is a cross-sectional view of an exhaust gas recirculation valve, in which both of the first and second pistons are pushed downward, according to the fourth embodiment of the present invention.

FIG. 12 shows a state of the EGR valve in which both of the solenoid valves 110 and 111 are on. Air at a positive pressure is applied to both of the first and second chambers 306*a* and 306*b*. In this case, the second piston 302 is pushed downward due to only the resiliency of the second spring 303 because the pressure exerted on the top face of the second piston 302 is equal to that exerted on the bottom face of the second piston 302. Furthermore, since the downward force, which is caused by the pressure difference between the first pressure chamber 306*a* and the lower space under the first piston communicated with the atmosphere via the port 100 in the housing 12 and which is greater than the elastic force of the first spring 19, is exerted on the first piston, the first piston 301 is pushed downward. Then, the connecting hook 301*a* of the first piston 301 comes into contact with the stopper 302*a* at the lower portion of the second piston 302 and therefore the first piston 301 is stopped. As a result, the control valve 6 is moved downward through the travel (L+M) and the exhaust gas recirculation valve 5 is fully opened.

Figure 13:
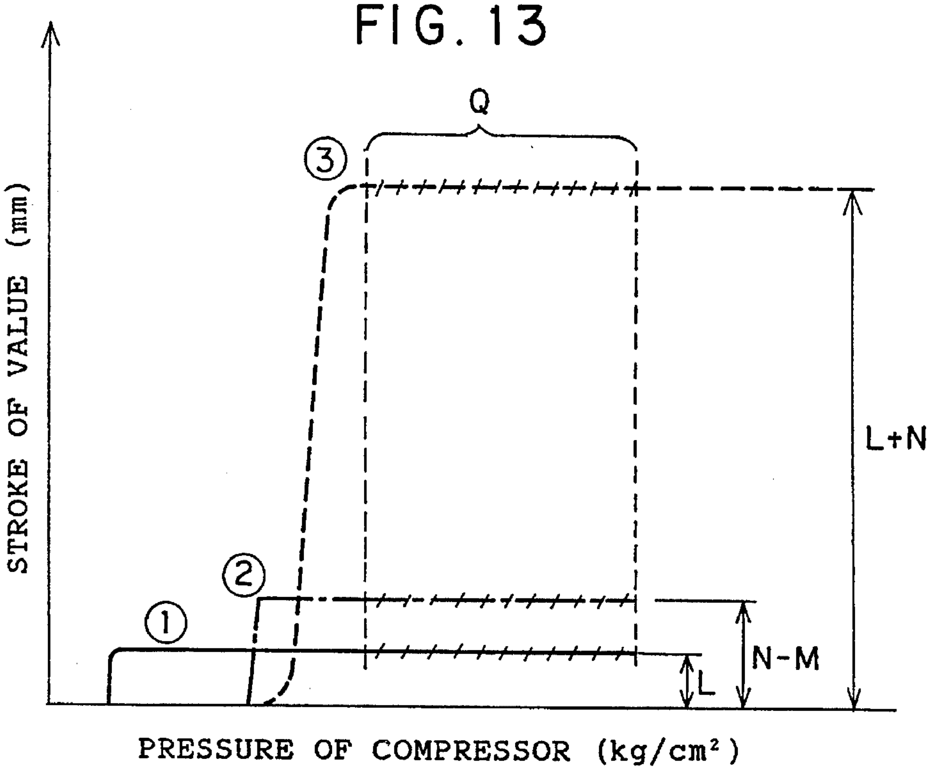
FIG. 13 is a graph showing a relationship between the pressure of a compressor and the stroke of a control valve in the exhaust gas recirculation valve according to the fourth embodiment of the present invention.

Referring now to FIG. 13, it illustrates a graph of the stroke of the control valve, which corresponds to the opening of the control valve, in the exhaust gas recirculation valve according to the fourth embodiment. The solid line ① in FIG. 13 shows a state of the EGR valve in which air at a positive pressure is applied to only the second pressure applying port 308 and its stroke is limited to the distance L. The dashed line ② in FIG. 13 shows a state of the EGR valve in which air at a positive pressure is applied to only the first pressure applying port 307 and its stroke is limited to the distance (N–M). The broken line ③ in FIG. 13 shows a state of the EGR valve in which air at a positive pressure is applied to both of the first and second pressure applying ports 307 and 308 and its stroke is limited to the distance (L+N). As shown in the figure, if the pressure of the compressor (or the pressure of the air fed by the compressor in the automobile) is within the range Q indicated by the oblique lines, the EGR valve can operate with reliability regardless of changes in the pressure of the compressor.

For example, to provide the maximum stroke of 15 mm for the control valve 6 and adjust the control valve to a fine opening level such as 10% or 20% of the maximum opening, the distances L, M, and N are set to be 1.5 mm, 10.5 mm, and 13.5 mm, respectively.

Thus, the opening of the control valve 6 of the exhaust gas recirculation valve 5 can be controlled with reliability at one of four opening levels, e.g., 0%, 10%, 20%, and 100% of the maximum opening, and it can be held precisely regardless of a change in the pressure of the pressure source and a change of the pressure of the exhaust gas, with the result that the amount of the recirculated exhaust gas can be controlled with high accuracy.

As previously mentioned, according to the fourth embodiment of the present invention, there is provided the first piston slidably disposed in the second piston and the second piston, engageable with the first piston, accommodating the first piston which can slide within a predetermined range, the pistons partially enclosing the first and second pressure chambers. Thus, the exhaust gas recirculation valve can provide four-level opening control for the control valve by using the difference of directions in which the pistons are moved. Thereby, the two positions of the control valve in the range of fine opening levels can be controlled precisely. Furthermore, the physical size of the exhaust gas recirculation valve can be reduced.

Figure 15:
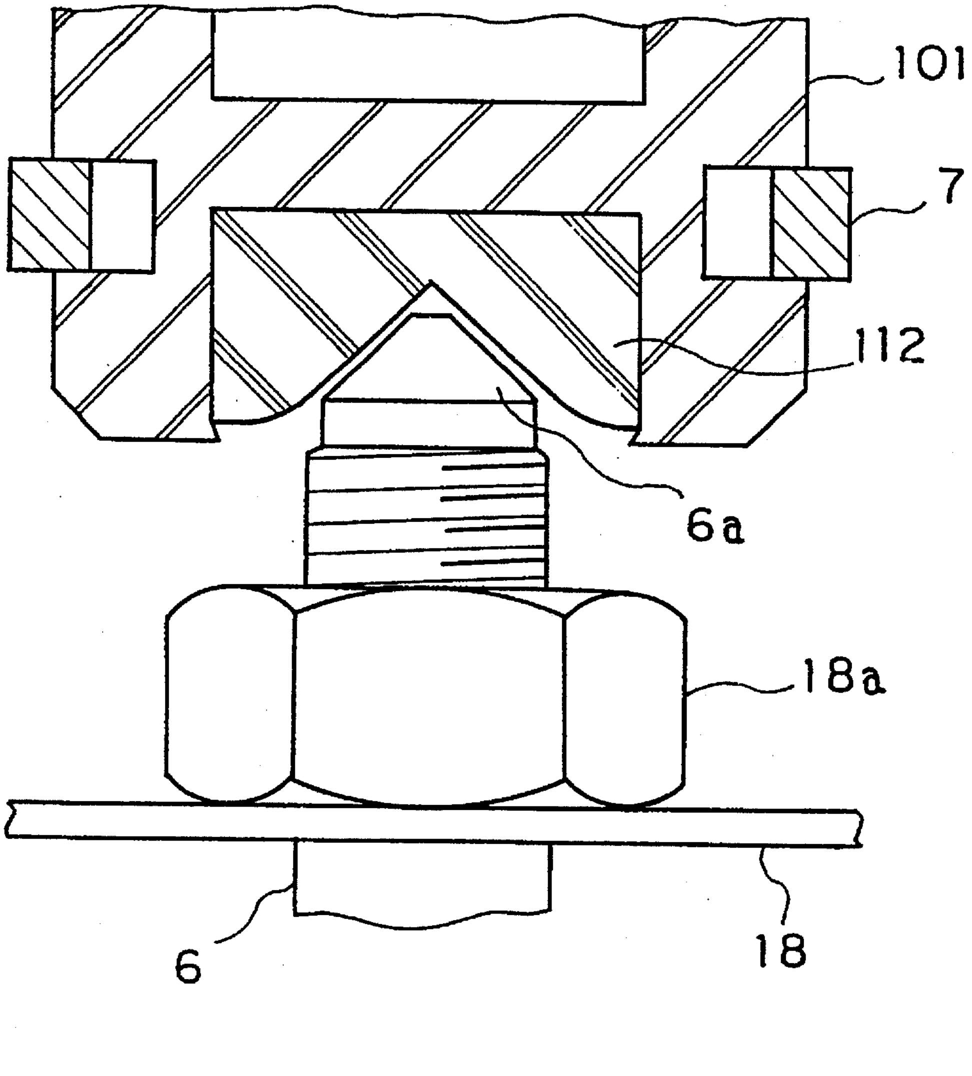
FIG. 15 is a partially cross-sectional view showing a variant of the exhaust gas recirculation valve according to the fifth embodiment of the present invention.
Figure 16:
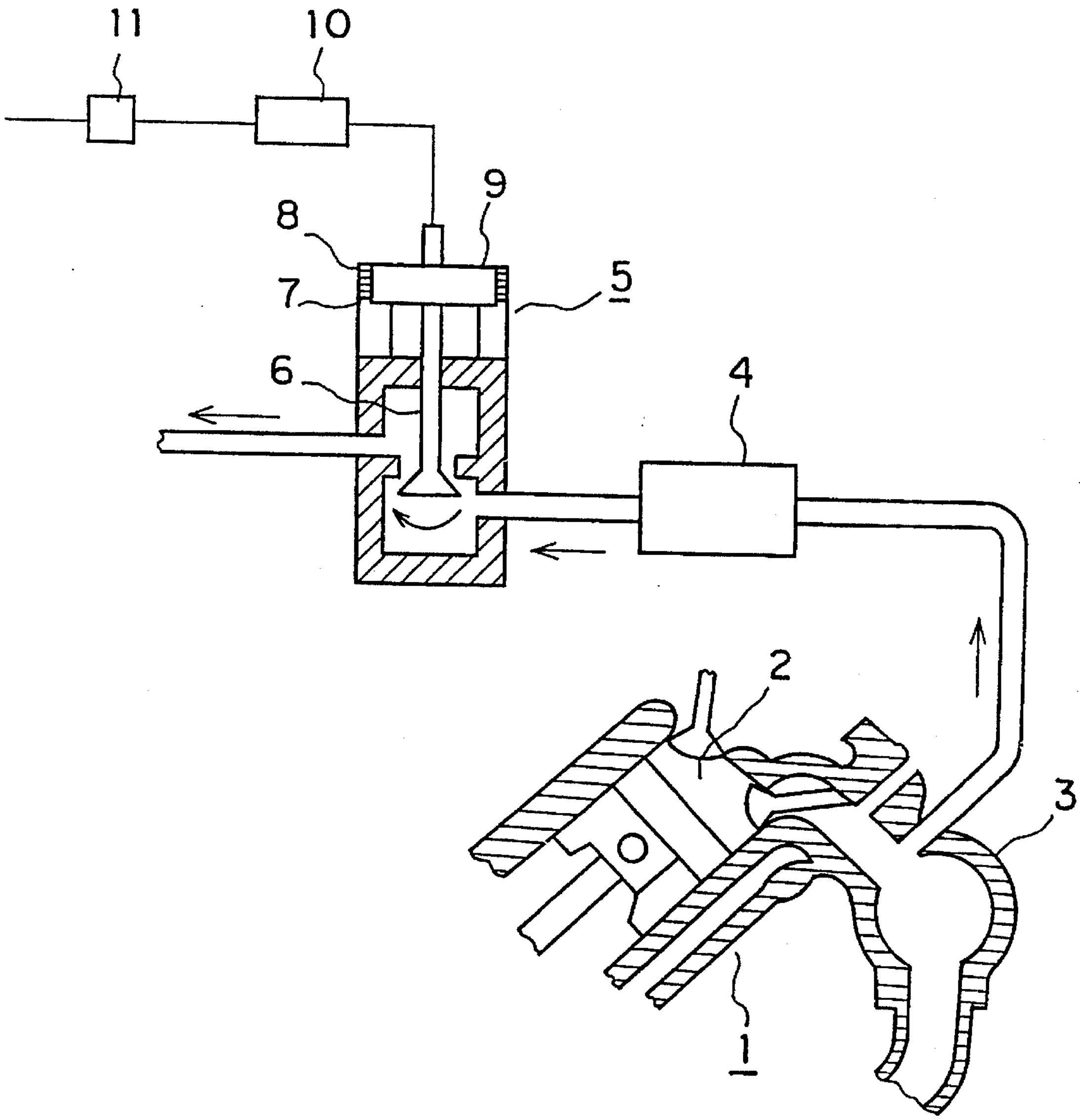
FIG. 16 (PRIOR ART)
FIG. 16 is a block diagram showing a prior art exhaust gas recirculation system.
Figure 17:
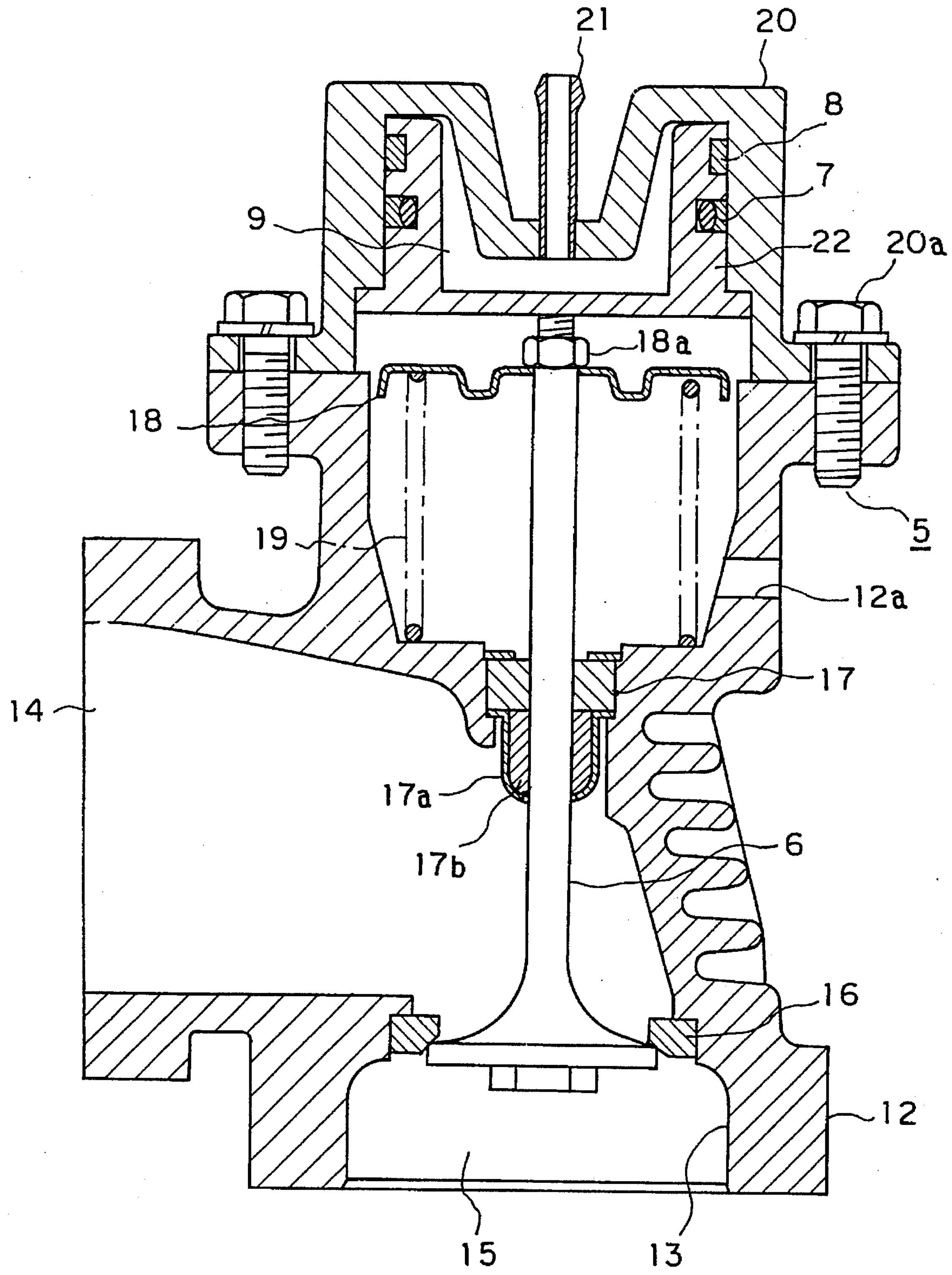
FIG. 17 (PRIOR ART)
FIG. 17 is a cross-sectional view of a prior art exhaust gas recirculation valve.

Next, the description will be directed to a fifth embodiment of the present invention. FIGS. 15 and 16 are partly enlarged cross-sectional views of the upper part of the control valve 6 and lower part of the first piston 101 of an exhaust gas recirculation valve according to the fifth embodiment of the present invention. The same elements as in the second embodiment are designated by the same reference numerals and the description about the elements will be omitted hereinafter.

In the case where the contact surfaces of the control valve 6 and first piston 101 are flat, as shown in FIG. 4 of the second embodiment, for example, the axis of the control valve 6 tends to be moved off the axis of the first piston 101 due to an unbalanced load or the like caused by an inclination of the first spring 19 if the EGR valve has no mechanism for positioning the end part of control valve 6 to the first piston 101. When the control valve 6 slides with the axis thereof tilted with respect to the sliding member 17, this movement not only prevents the control valve 6 itself from smoothly sliding through the sliding member 17 but also causes an early wearing down of the sliding member 17. On the other hand, strongly constraining the contact portions of the control valve 6 and first piston 101 exerts a bad influence upon the assembly of the EGR valve and hence is not suitable for mass production.

Therefore, the exhaust gas recirculation valve needs a mechanism for automatically determining the position where both of the control valve 6 and first piston 101 abut on each other when assembling the EGR valve itself, and for making both of the control valve 6 and first piston 101 be contact with each other with a freedom with respect to inclinations of both of them.

Figure 14:
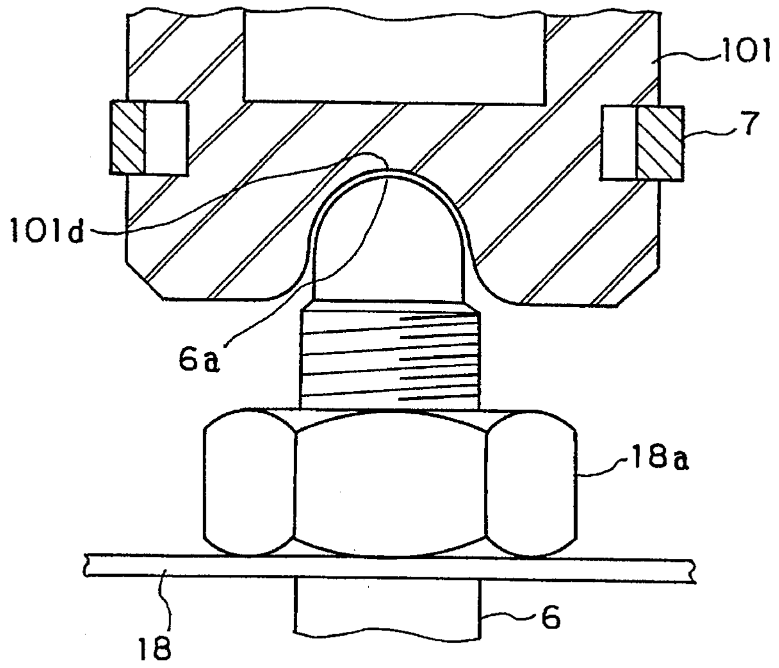
FIG. 14 is a partially cross-sectional view showing an example of an exhaust gas recirculation valve according to a fifth embodiment of the present invention.

In FIGS. 14 and 15, reference numeral 6 denotes a control valve, and 6*a* denotes a generally sphere-shaped convex portion formed at one end of the control valve 6. Furthermore, 101 denotes a first piston which can abut on the end portion of the control valve 6, and 101*d* denotes a generally sphere-shaped concave portion of the first piston. When the control valve 6 is moved downward, the convex portion 101*a* and concave portion 6*a* are engaged with each other. Both of the control valve 6 and first piston 101 abut on each other rotatably. Therefore, even if any one of the axes of both of them is inclined, the position where both of them abut on each other remains unchanged and the convex and concave portions accommodate the inclination of the axis. Thus, an increase in the unbalanced load on the spring can be prevented, thereby allowing the control valve 6 and first piston 101 to slide smoothly. Particularly, since the inclination of the axis of the control valve 6 with respect to the movable component located above the control valve is increased in the case where air at a positive pressure is supplied to the pressure chamber 9*d* located under the movable components, for example, in the first embodiment, such the structure according to the fifth embodiment is very useful to solve the problem mentioned above.

FIG. 15 shows a variant of the convex and concave portions according to the fifth embodiment of the present invention. The convex and concave portions, engageable with each other, of the control valve 6 and first piston 101 are of generally conical shape. In the figure, reference numeral 112 denotes a contact member inserted or pressed into the first piston 101. When the first piston 101 is made of a relatively pliant material such as aluminum or the like for the purpose of, for example, weight reduction, and the contact areas of the contact portions cannot be increased to a considerable degree, the contact member 112, the hardness of the surface of which is increased by hardening, surface treatment, or the like, can prevent malfunctions such as deformation, wear, and the like of the contact member.

As previously mentioned, according to the fifth embodiment of the present invention, the contact portions of the control valve and first piston are rotatably engaged with each other. Therefore, the resistance to the sliding movements of both of them is not affected, i.e., is not increased and a departure of the contact portion of the control valve from the normal position can be prevented, even if the axis of the control valve is inclined with respect to the axis of the first piston. Thereby, endurance of the exhaust gas recirculation valve is improved.

It should be noted that, in the second, third, and fourth embodiment, air at a positive pressure may be applied to the pressure chamber 9*d*, like in the first embodiment.

As previously explained, the present invention offers the following advantage. The present invention provides an exhaust gas recirculation valve, the valve opening of which remains unchanged even if the pressure of air applied thereto is varied or ripples of the pressure of exhaust gas take place, and which can operate with reliability and stability.

Many widely different embodiments of the present invention may be constructed without departing from the spirit and scope of the present invention. It should be understood that the present invention is not limited to the specific embodiments described in the specification, except as defined in the appended claims.

What is claimed is:

1. An exhaust gas recirculation valve comprising:

a housing which constructs a part of an exhaust gas path for receiving exhaust gas from an exhaust pipe of an internal combustion engine, said housing accommodating a valve means for controlling the amount of flow of the exhaust gas passing therethrough;

a fixed cylinder disposed in said housing;

a movable cylinder assembly composed of at least one movable cylinder disposed in said fixed cylinder;

a piston movably disposed in said movable cylinder assembly for controlling an opening of said valve means; and a pressure applying means for respectively applying pressure to said movable cylinder and said piston so as to move them through respective predetermined strokes.

2. The exhaust gas recirculation valve according to claim 1, wherein said movable cylinder assembly comprises at least said first movable cylinder and a second movable cylinder disposed in said first movable cylinder, and wherein said piston is located in said second movable cylinder.

3. The exhaust gas recirculation valve according to claim 2, wherein said exhaust gas recirculation valve further comprises a first pressure chamber surrounded by at least said fixed cylinder and said first movable cylinder, a second pressure chamber surrounded by at least said first and second movable cylinders, and a third pressure chamber surrounded by at least said second movable cylinder and said piston, and wherein said pressure applying means can apply pressure to each of said first, second and third pressure chambers.

4. The exhaust gas recirculation valve according to claim 1, wherein said exhaust gas recirculation valve further comprises a first pressure chamber surrounded by at least said fixed cylinder and said movable cylinder and a second pressure chamber surrounded by at least said movable cylinder and said piston, and wherein said pressure applying means can apply pressure to each of said first and second pressure chambers.

5. The exhaust gas recirculation valve according to claim 1, wherein the predetermined strokes of said movable cylinder assembly and piston are different from each other, and wherein when said movable cylinder assembly comprises a plurality of movable cylinders, predetermined strokes of said plural movable cylinders are different from each other.

6. The exhaust gas recirculation valve according to claim 1, wherein the predetermined stroke of said one movable cylinder with the largest surface to which pressure is applied by said pressure applying means is the shortest.

7. The exhaust gas recirculation valve according to claim 1, wherein at least one component among said movable cylinder assembly and said piston has two opposite surfaces to each of which pressure is applied, and wherein the pressure applied to each of the two opposite surfaces is controlled individually.

8. The exhaust gas recirculation valve according to claim 1, wherein portions, engageable with each other, of said valve means and said piston are of generally spherical shape or of generally conical shape.

9. The exhaust gas recirculation valve according to claim 1, wherein said exhaust gas recirculation valve further comprises a contact portion which abuts on said one movable cylinder of said movable cylinder assembly for limiting a range of motion of said movable cylinder to the predetermined stroke.

10. The exhaust gas recirculation valve according to claim 1, wherein there is provided a lower pressure chamber, either to which pressure can be applied or which can be sealed, located under said fixed cylinder in said housing.

11. An exhaust gas recirculation valve comprising:

a housing which constructs a part of an exhaust gas path for receiving exhaust gas from an exhaust pipe of an internal combustion engine, said housing accommodating a valve means for controlling the amount of flow of the exhaust gas passing therethrough;

a cylinder mounted on said housing;

a first piston movably disposed in said cylinder for controlling an opening of said valve means;

a second piston movably disposed in said cylinder and engageable with said first piston, said second piston being able to slide through a predetermined stroke with respect to said first piston; and a pressure applying means for respectively applying pressure to said first and second pistons so as to move them through respective predetermined strokes.

12. The exhaust gas recirculation valve according to claim 11, wherein the predetermined stroke of said one piston with the largest surface to which pressure is applied by said pressure applying means is the shortest.

13. The exhaust gas recirculation valve according to claim 11, wherein at least one of said first and second pistons has two opposite surfaces to each of which pressure is applied, and wherein the pressure applied to each of the two opposite surfaces is controlled individually.

14. The exhaust gas recirculation valve according to claim 11, wherein portions, engageable with each other, of said valve means and said first piston are of generally spherical shape or of generally conical shape.

15. The exhaust gas recirculation valve according to claim 11, wherein said exhaust gas recirculation valve further comprises a contact portion which abuts on said second piston for limiting a range of motion of said second piston to the predetermined stroke.

16. The exhaust gas recirculation valve according to claim 11, wherein there is provided a lower pressure chamber, either to which pressure can be applied or which can be sealed, located under said cylinder in said housing.

17. The exhaust gas recirculation valve according to claim 11, wherein the predetermined strokes of said first and second pistons are different from each other.

18. The exhaust gas recirculation valve according to claim 17, wherein the predetermined stroke of said one piston with the largest surface to which pressure is applied by said pressure applying means is the shortest.

19. The exhaust gas recirculation valve according to claim 17, wherein at least one of said first and second pistons has two opposite surfaces to each of which pressure is applied, and wherein the pressure applied to each of the two opposite surfaces is controlled individually.

20. The exhaust gas recirculation valve according to claim 17, wherein portions, engageable with each other, of said valve means and said first piston are of generally spherical shape or of generally conical shape.

21. The exhaust gas recirculation valve according to claim 17, wherein said exhaust gas recirculation valve further comprises a contact portion which abuts on said second piston for limiting a range of motion of said second piston to the predetermined stroke.

22. The exhaust gas recirculation valve according to claim 17, wherein there is provided a lower pressure chamber, either to which pressure can be applied or which can be sealed, located under said cylinder in said housing.

* * * * *